May 5, 1936.　　　N. C. OVAITT　　　2,039,925
PAY ROLL CHECK MACHINE
Filed Oct. 21, 1930　　　29 Sheets-Sheet 2
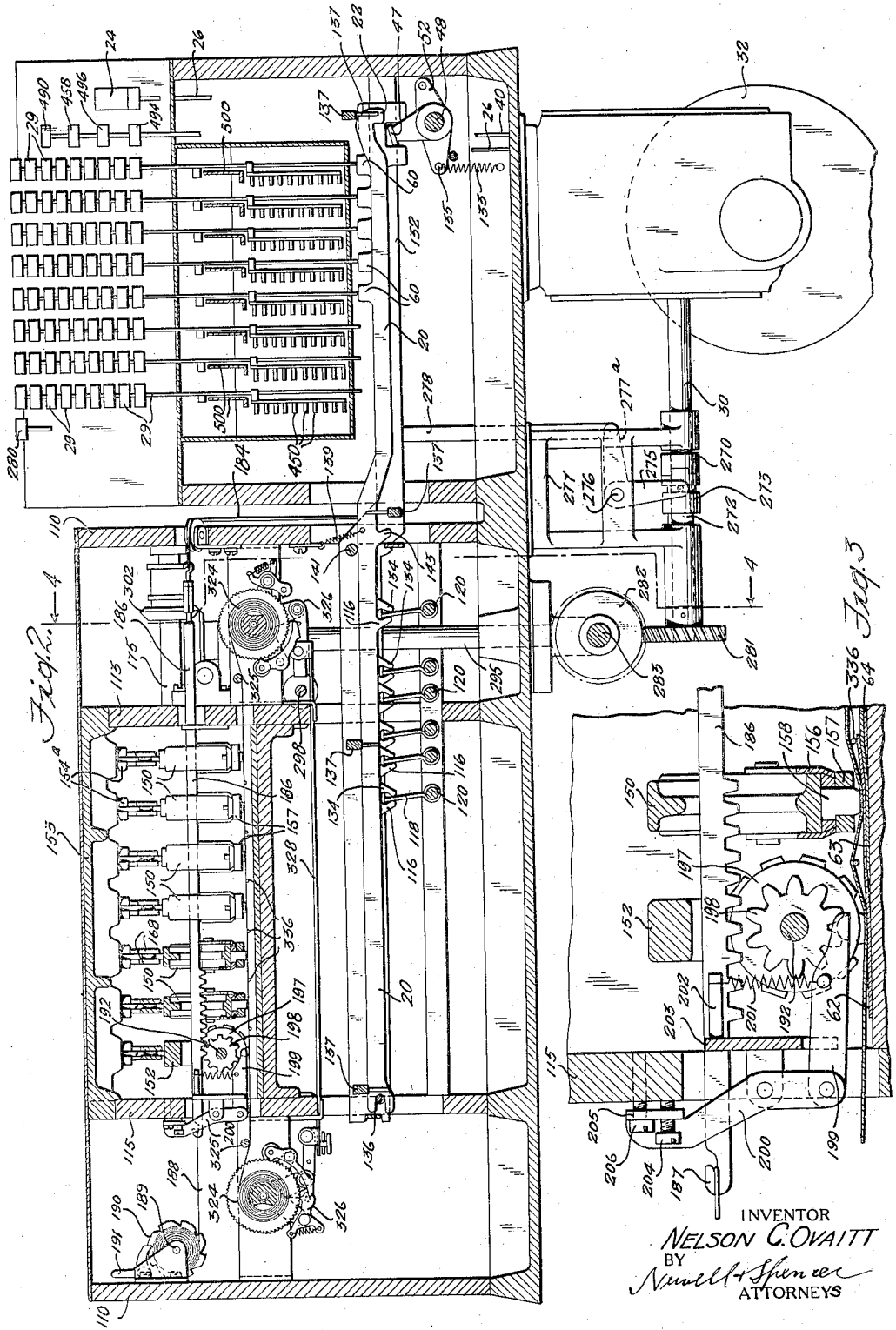
INVENTOR
*NELSON C. OVAITT*
BY
*Newell & Spencer*
ATTORNEYS May 5, 1936.  N. C. OVAITT  2,039,925
PAY ROLL CHECK MACHINE
Filed Oct. 21, 1930   29 Sheets-Sheet 3

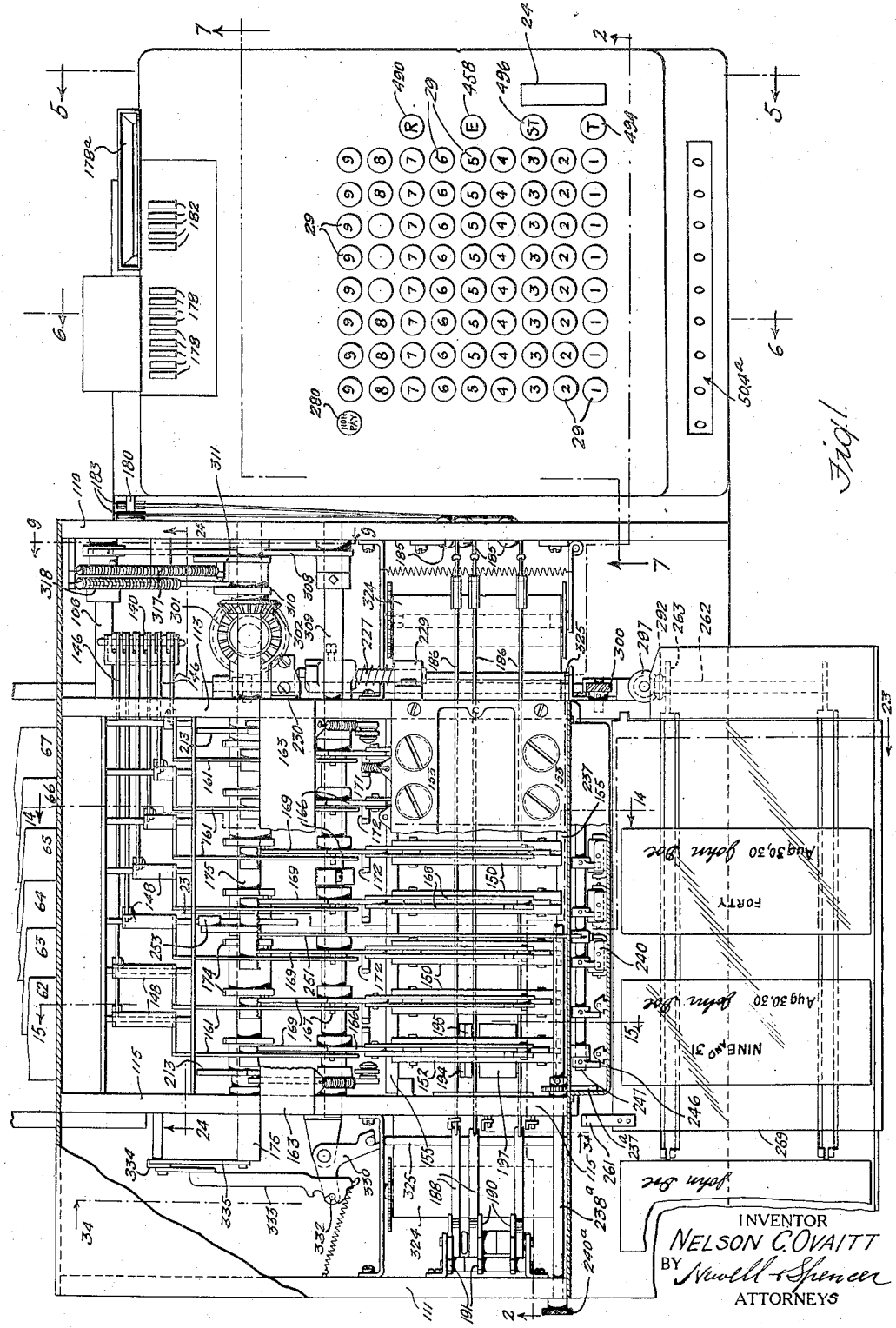

INVENTOR
NELSON C. OVAITT
BY
Newell & Spencer
ATTORNEYS

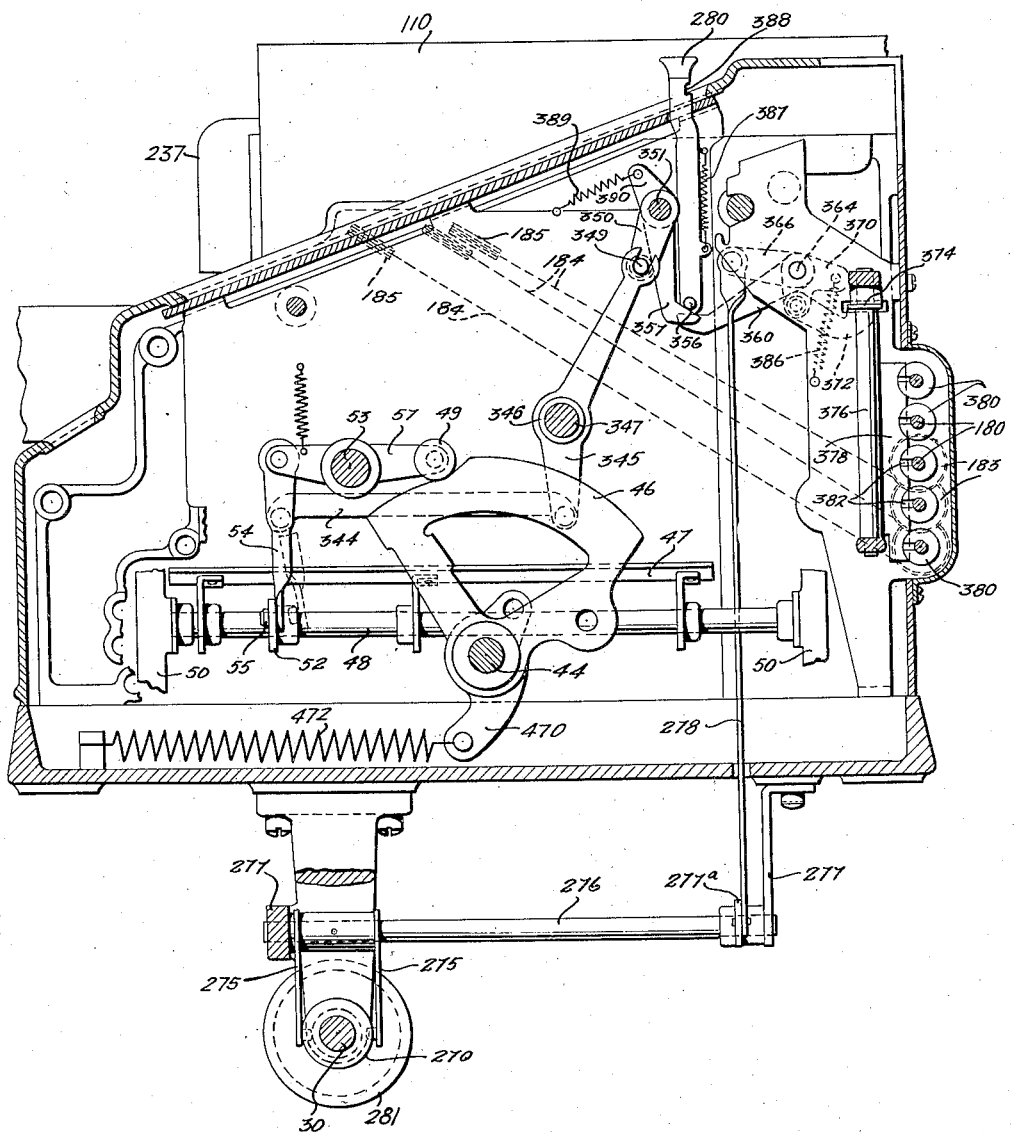

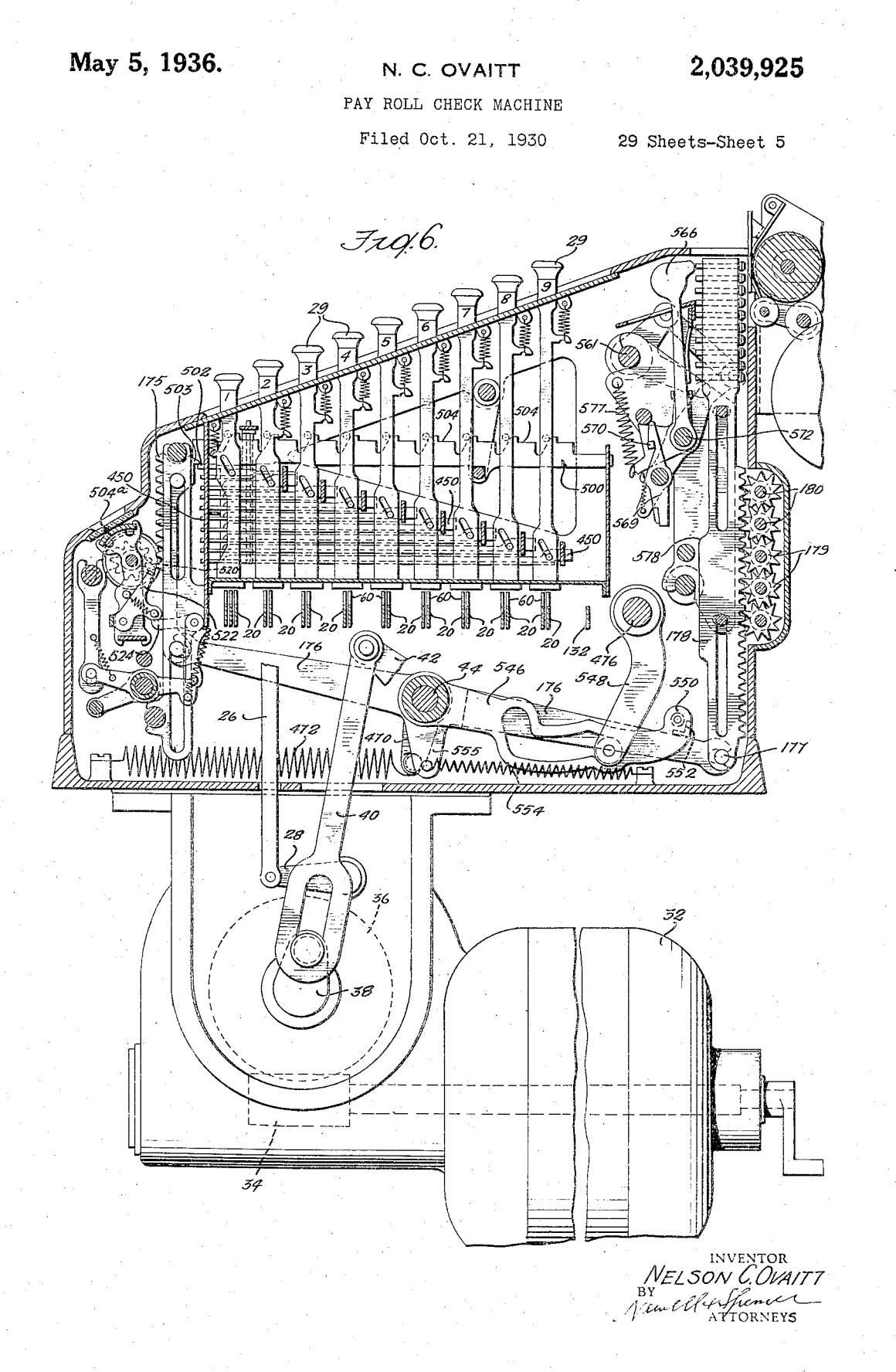

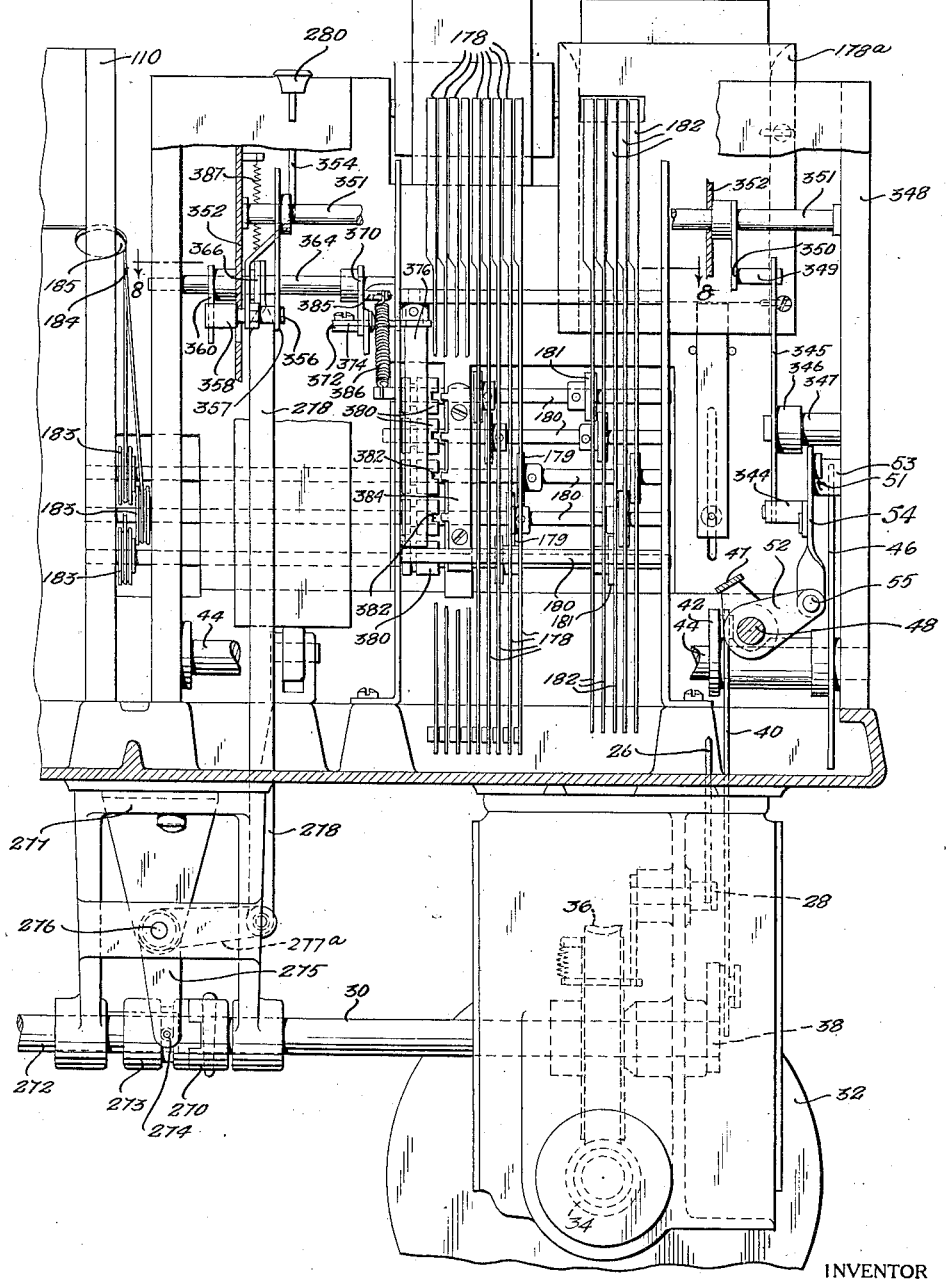

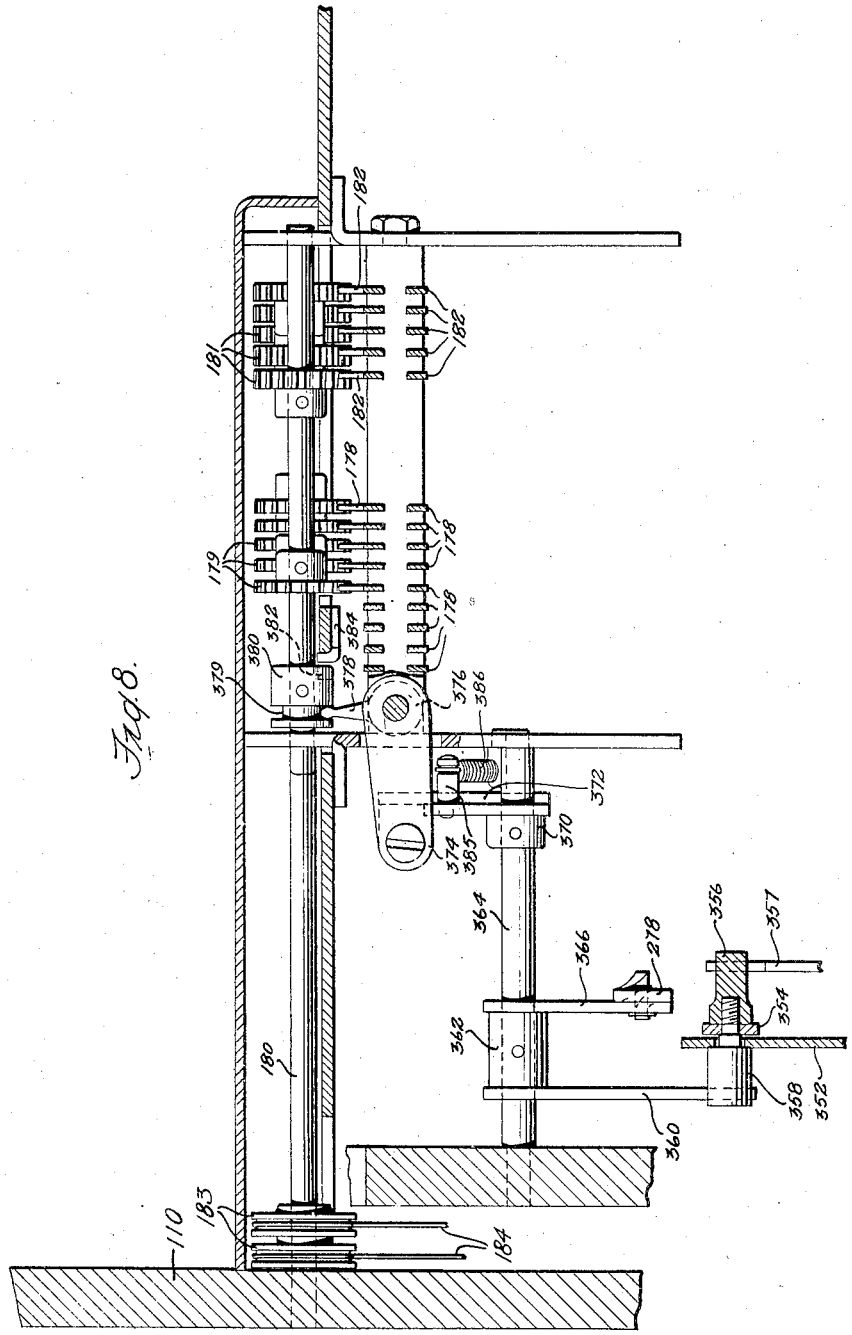

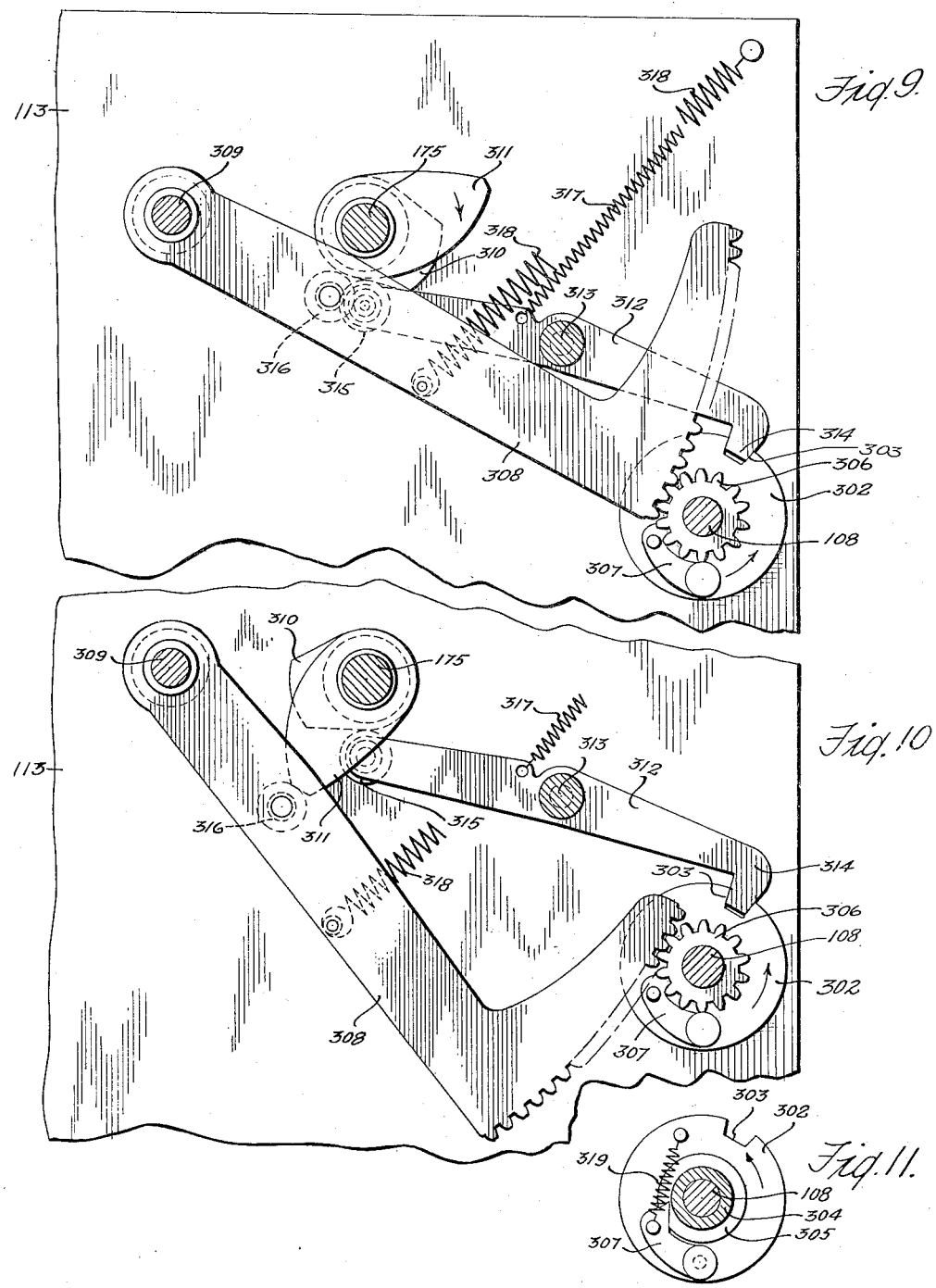

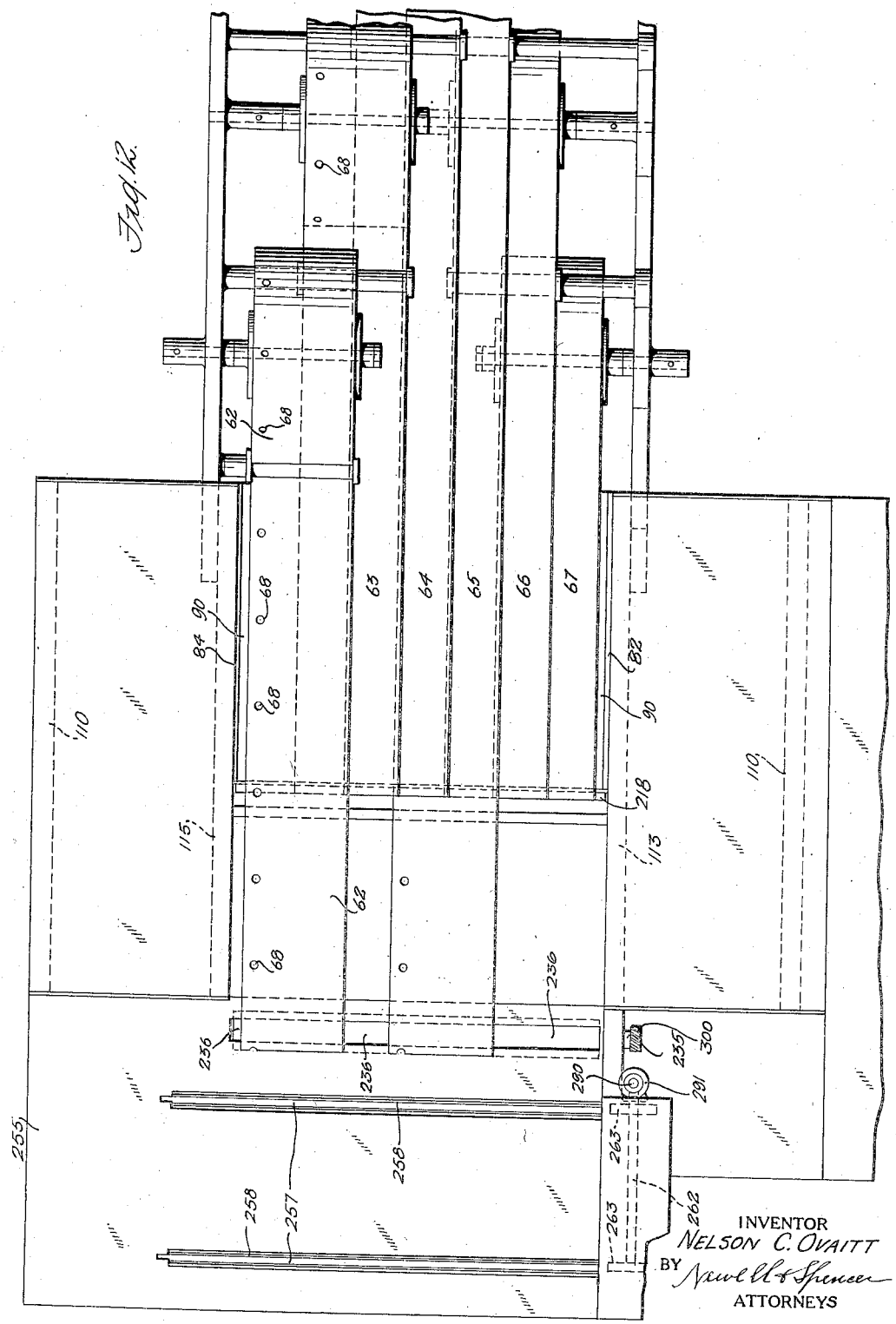

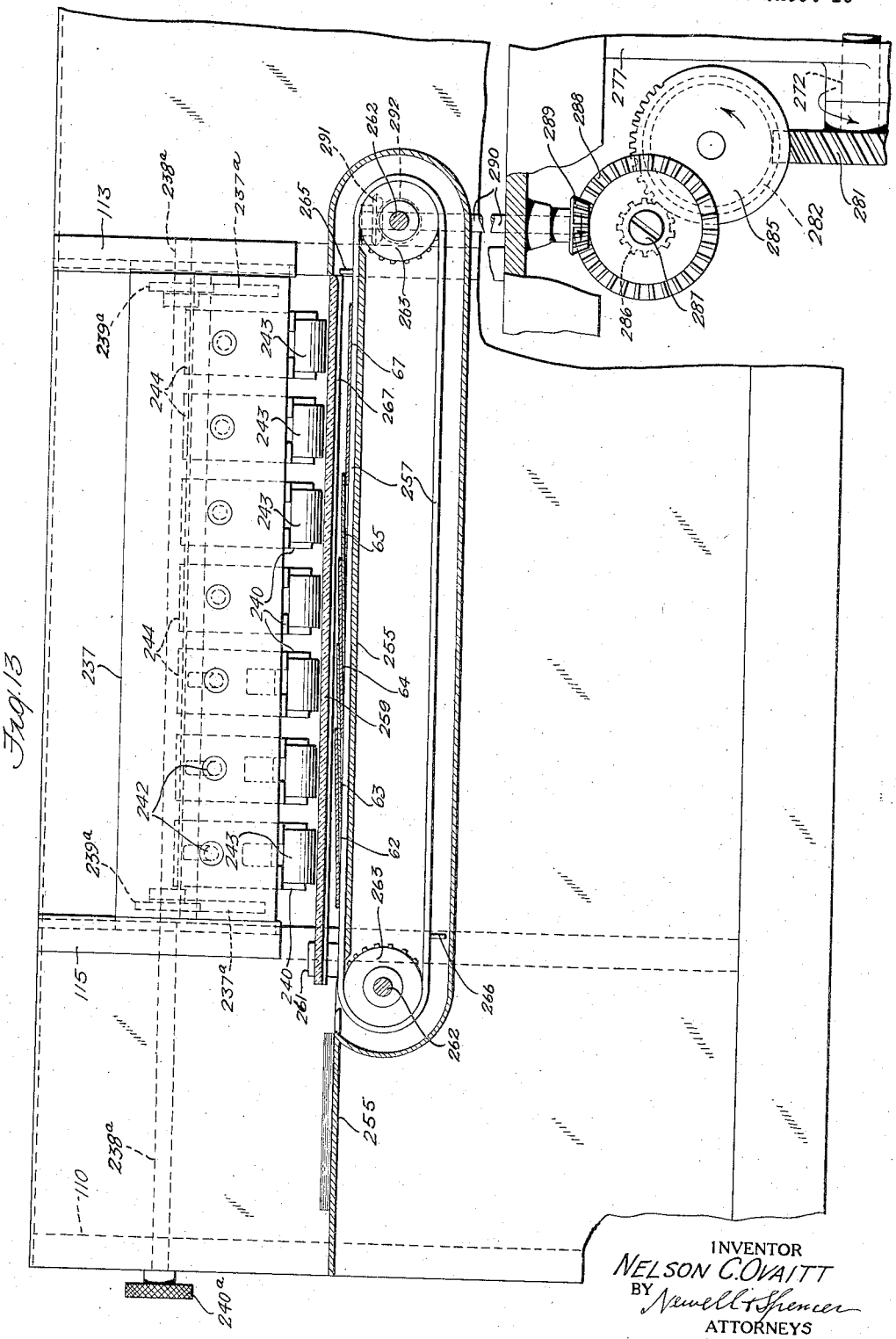

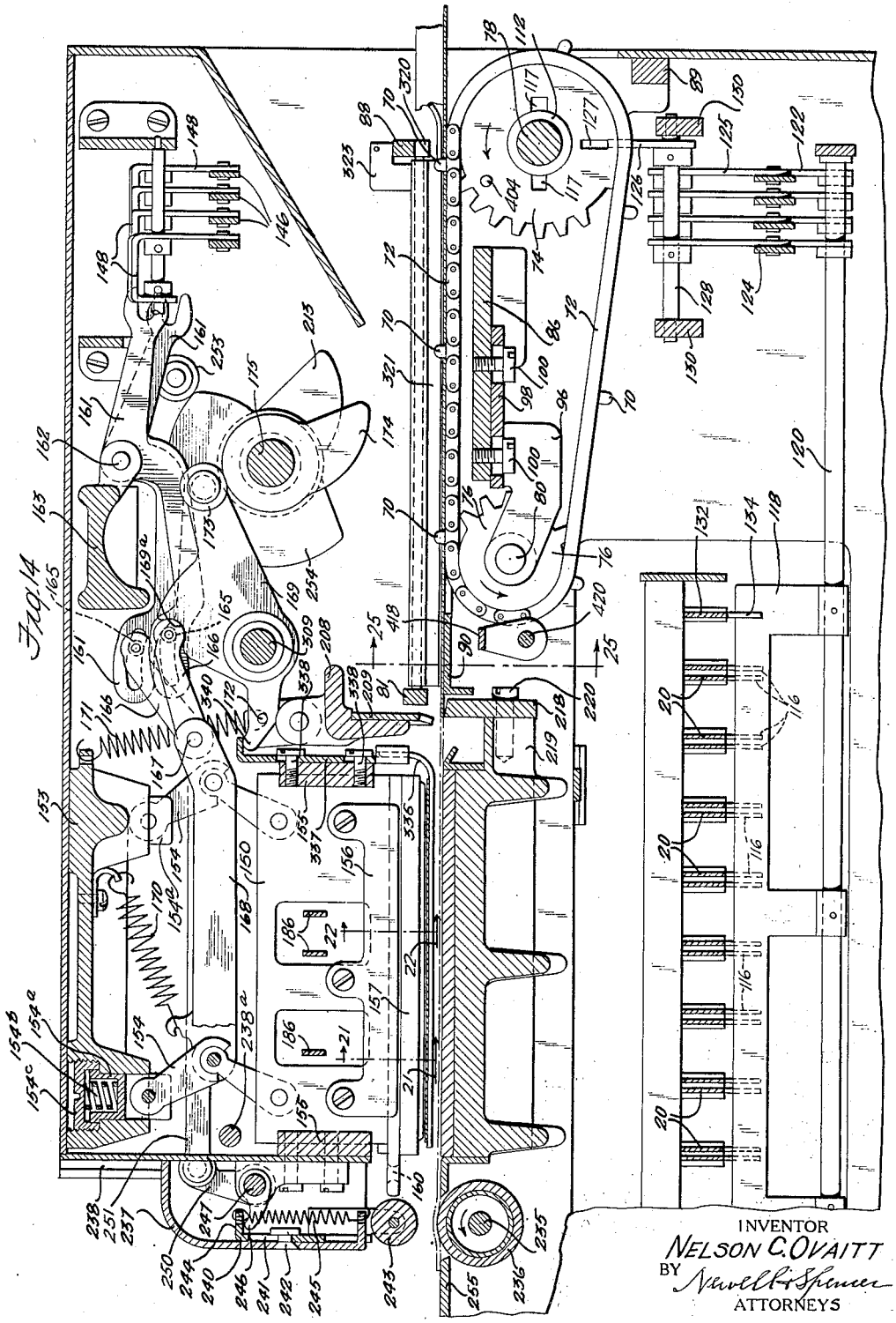

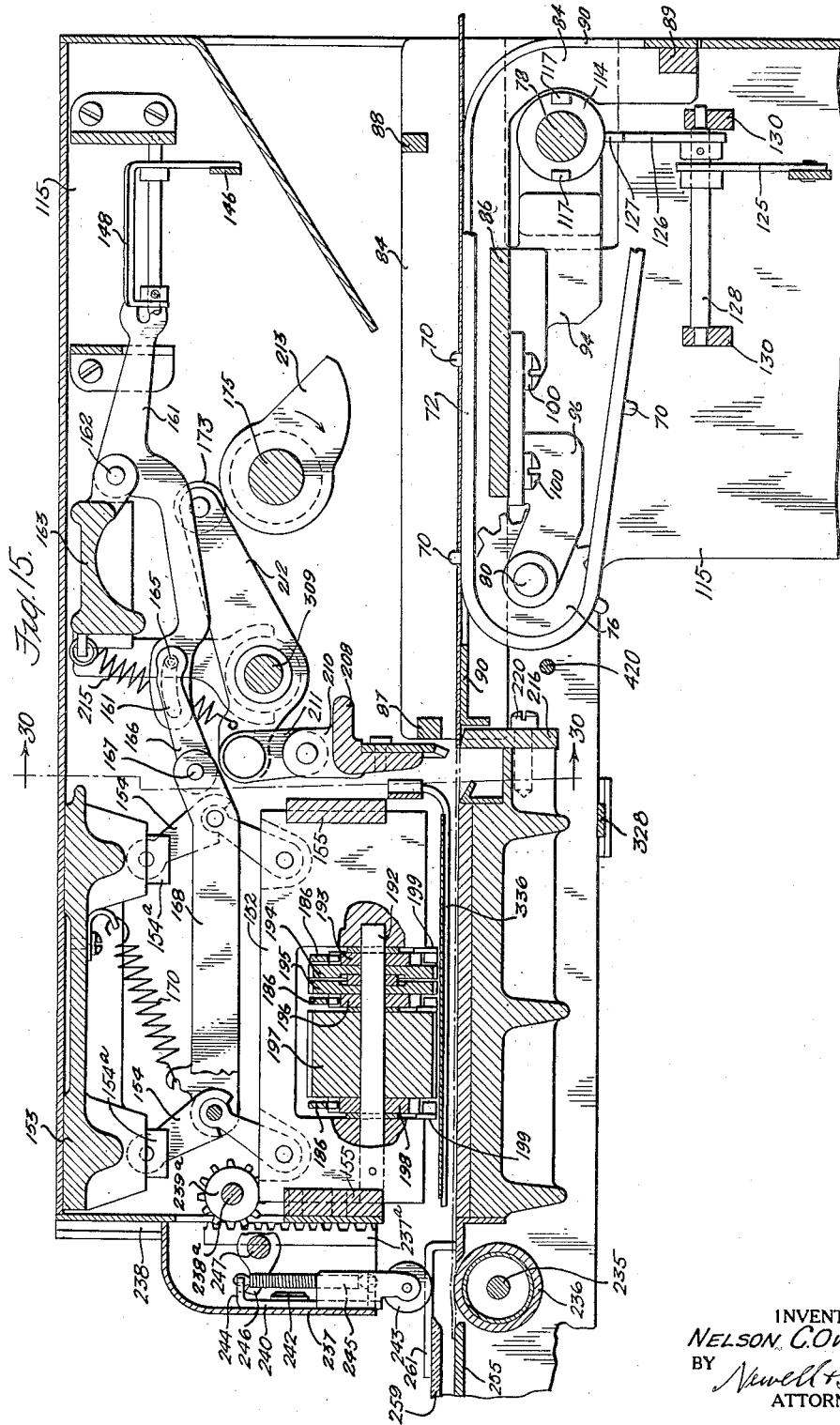

May 5, 1936.                N. C. OVAITT                  2,039,925
                        PAY ROLL CHECK MACHINE
                        Filed Oct. 21, 1930        29 Sheets-Sheet 13

INVENTOR
NELSON C. OVAITT
BY
ATTORNEYS

May 5, 1936.　　　　N. C. OVAITT　　　　2,039,925
PAY ROLL CHECK MACHINE
Filed Oct. 21, 1930　　29 Sheets-Sheet 14
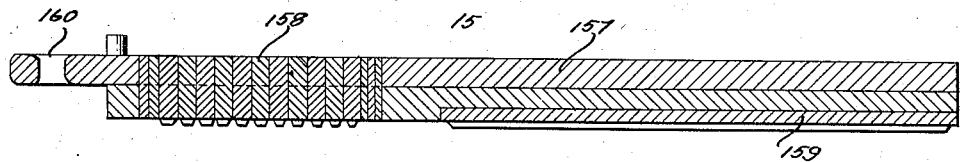
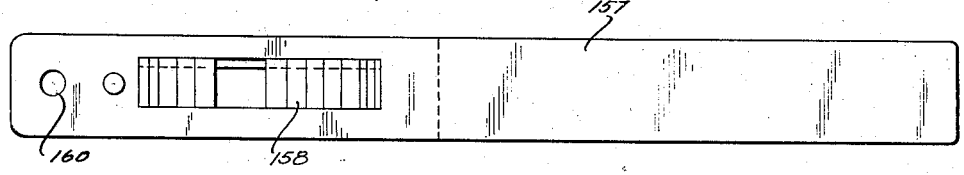
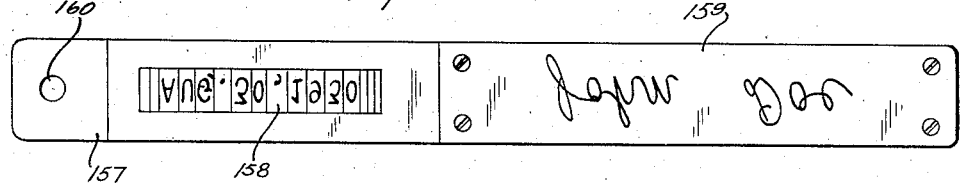
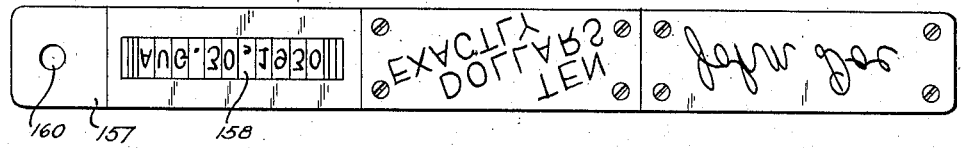
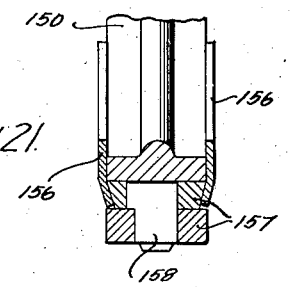
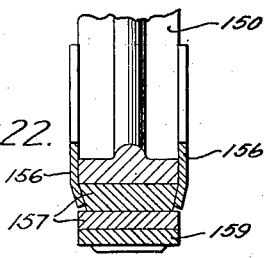
INVENTOR
NELSON C. OVAITT
BY
Newell & Spencer
ATTORNEYS

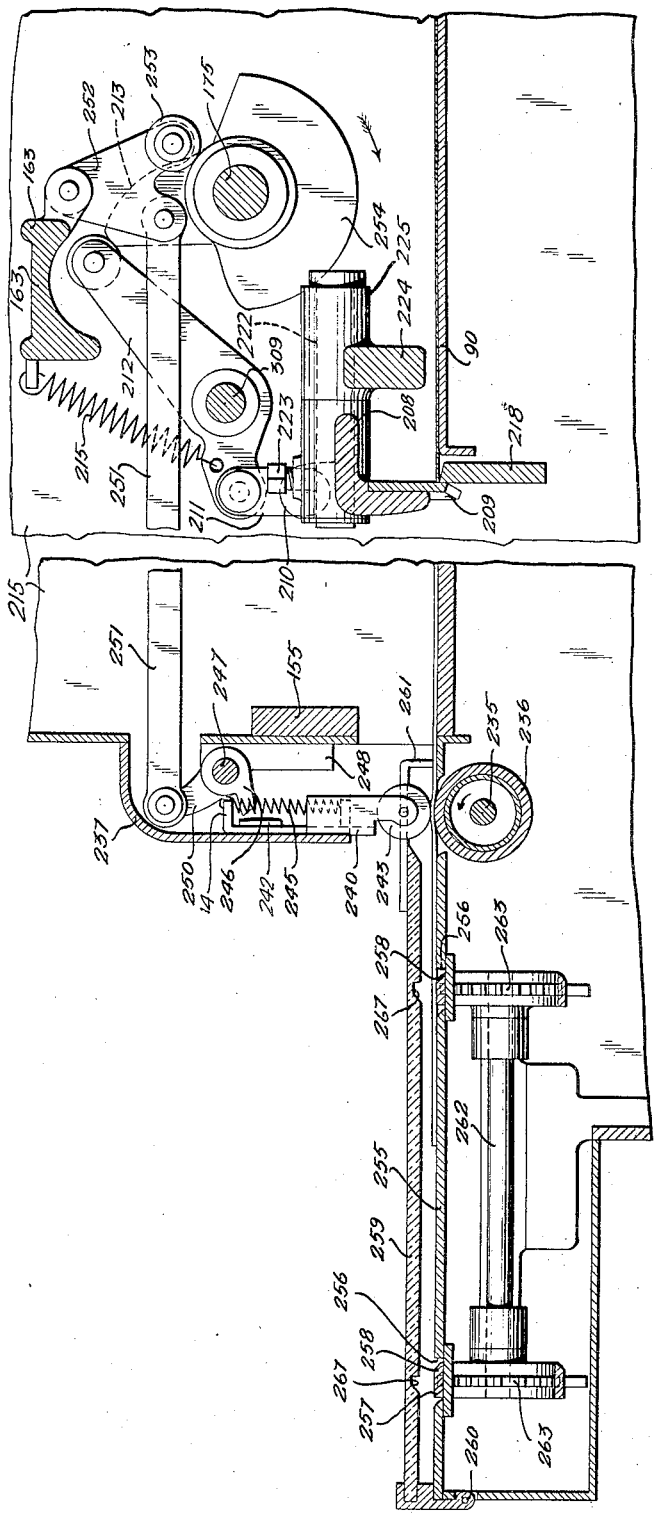

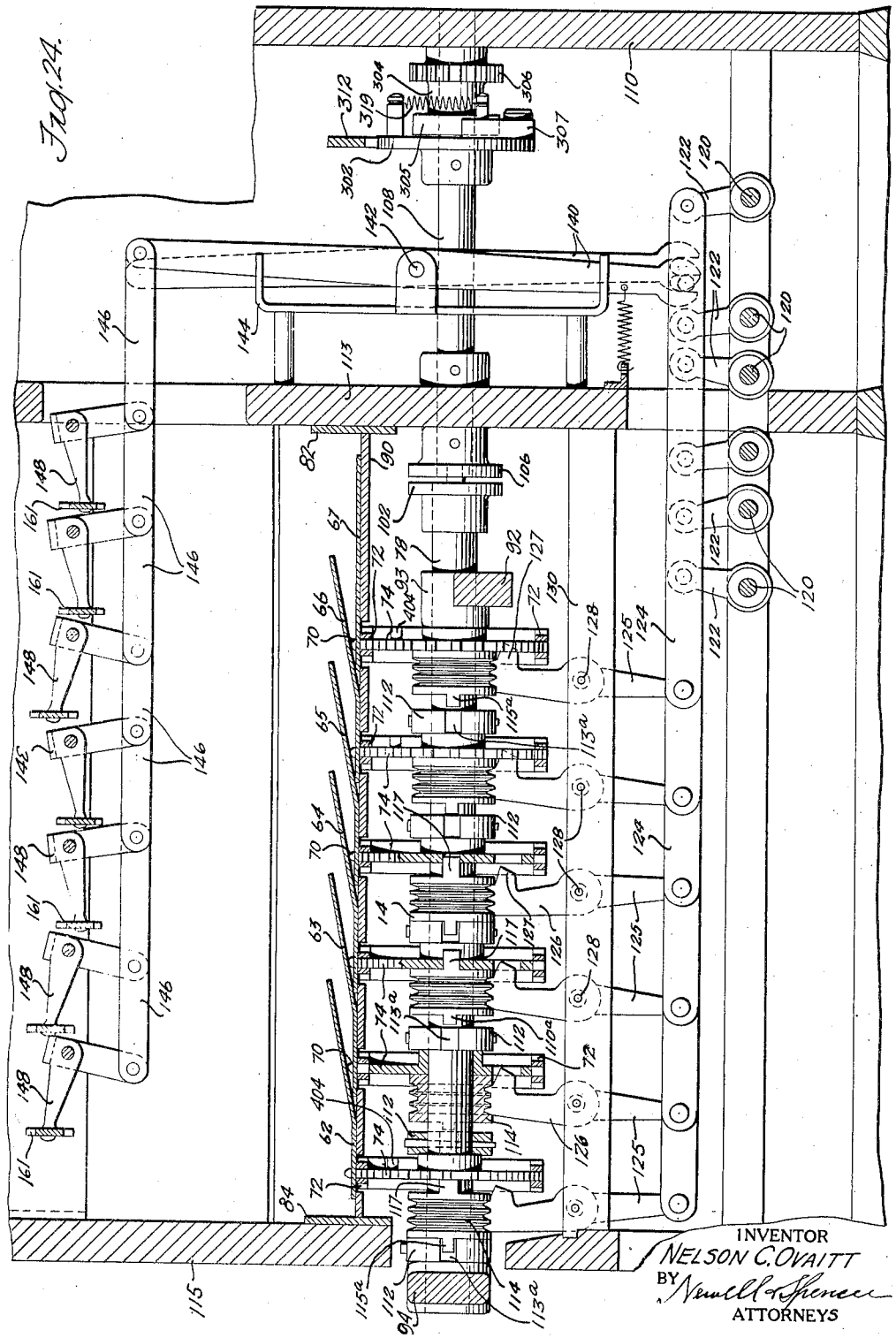

May 5, 1936.　　　　　N. C. OVAITT　　　　　2,039,925
PAY ROLL CHECK MACHINE
Filed Oct. 21, 1930　　　29 Sheets-Sheet 17
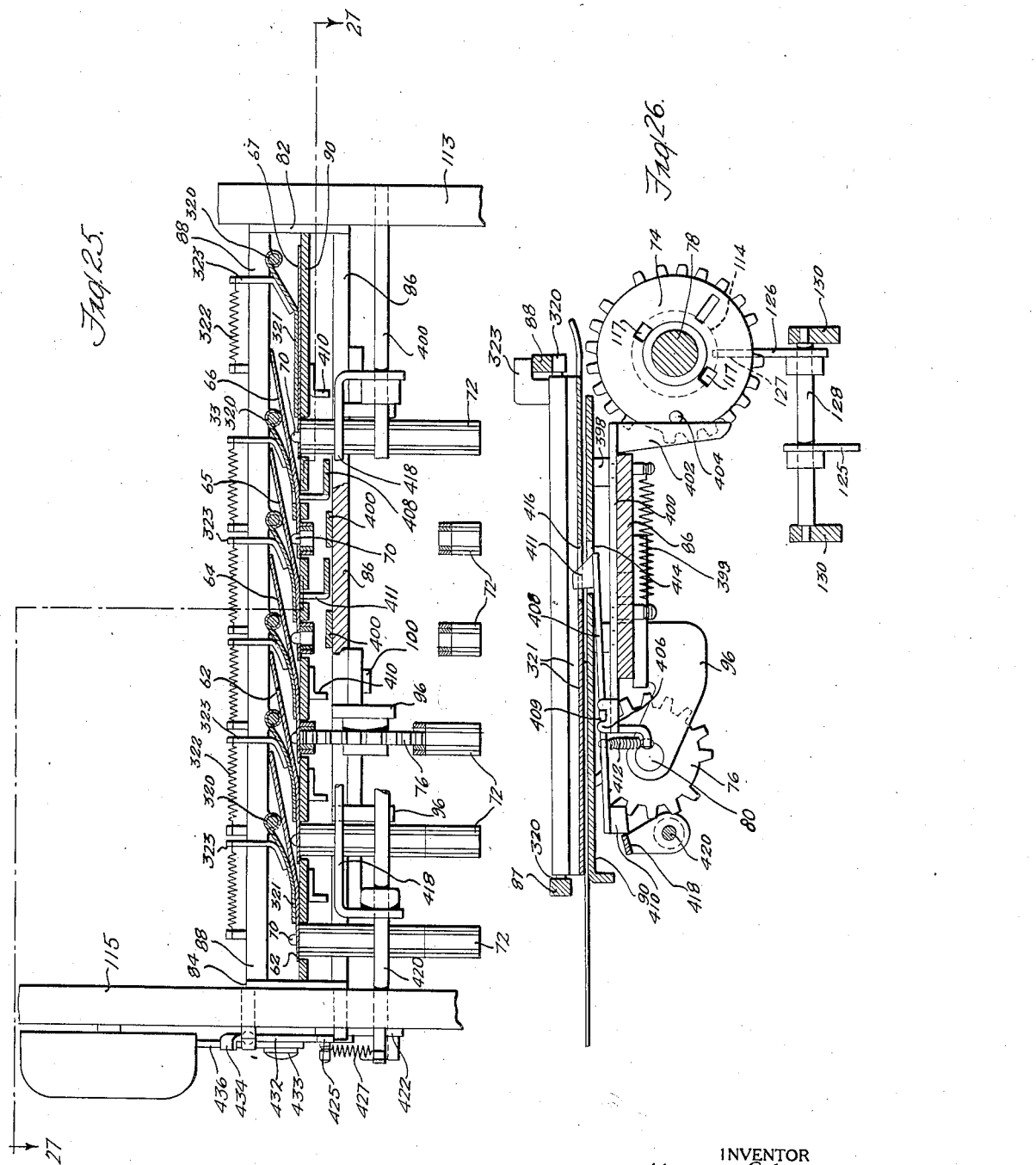
INVENTOR
NELSON C. OVAITT
BY
Newell + Spencer
ATTORNEYS

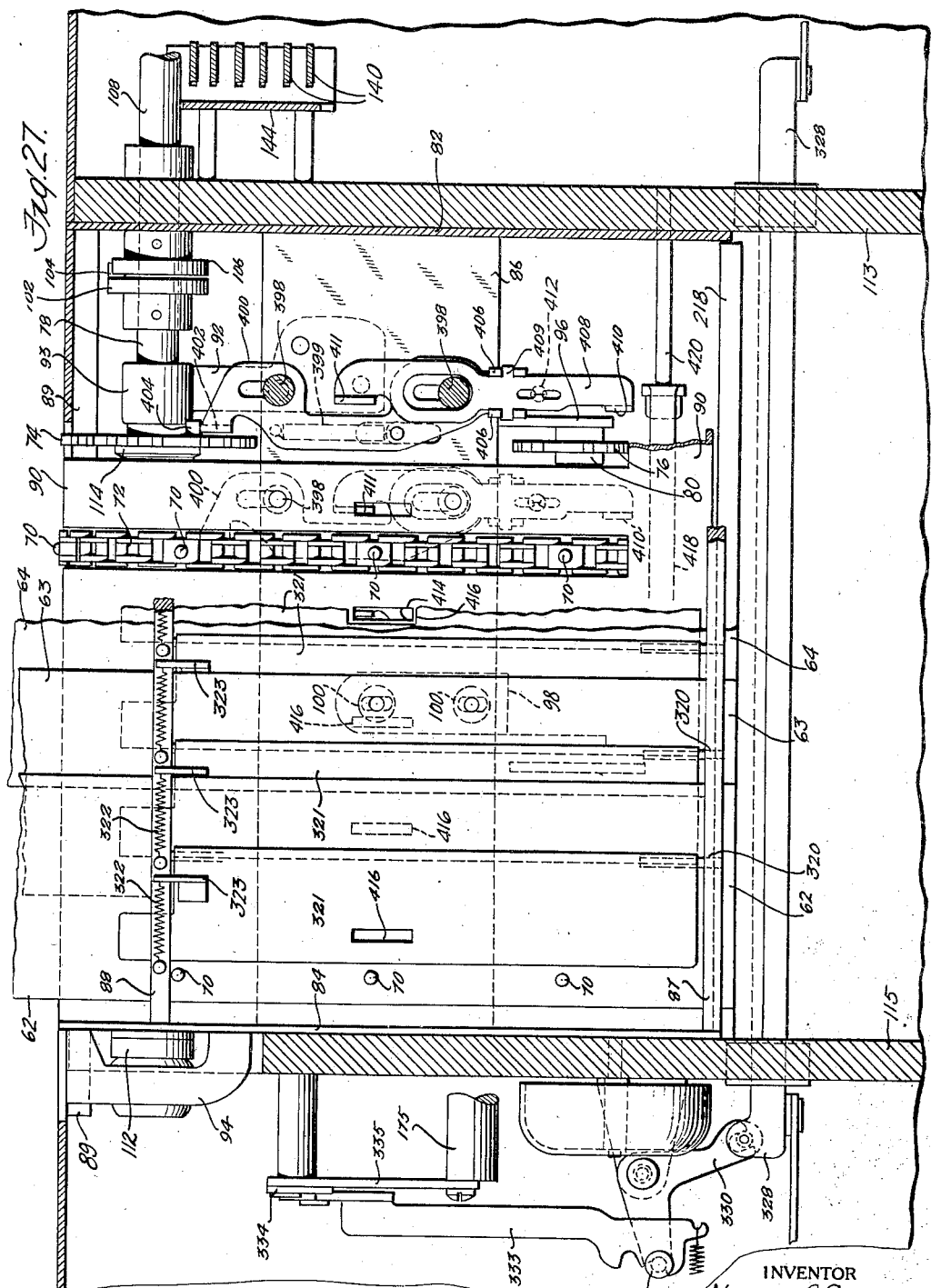

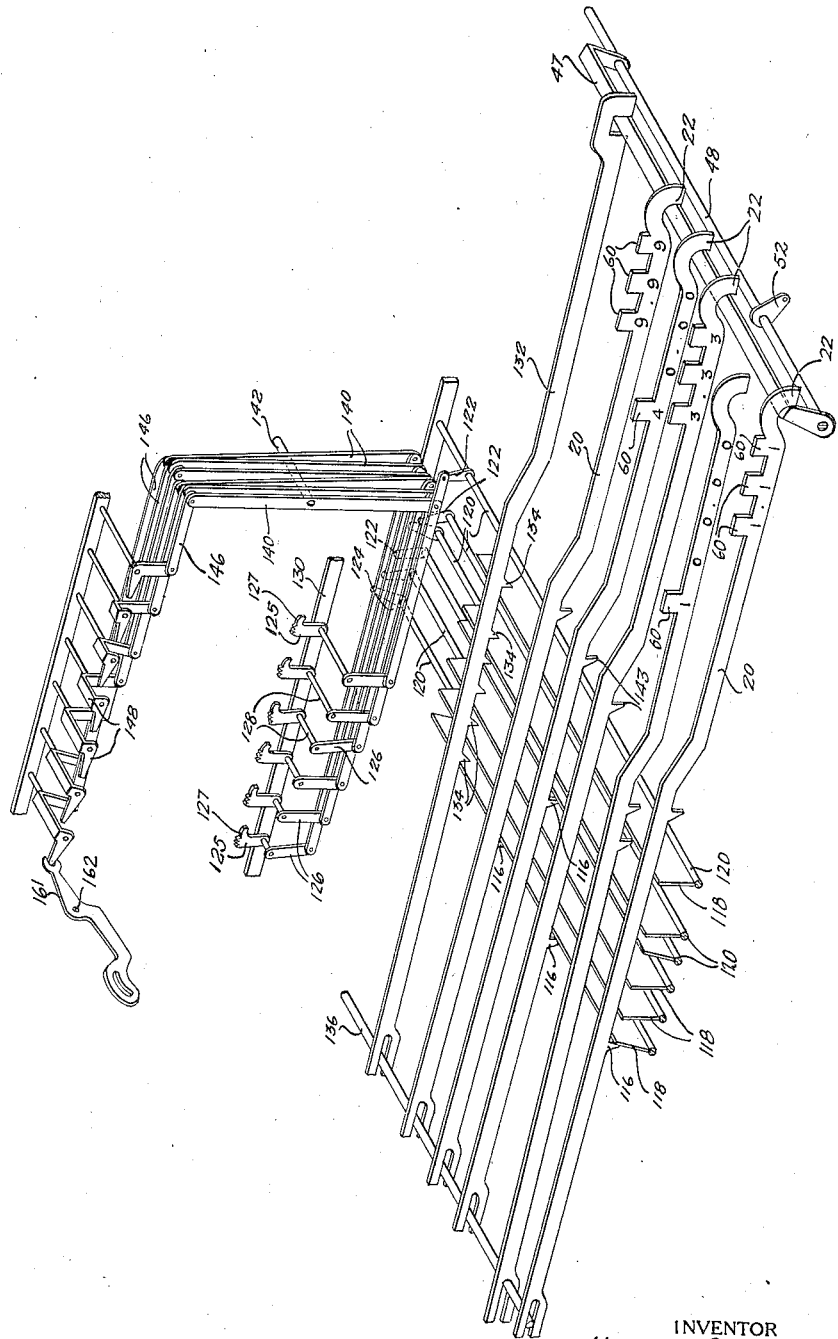

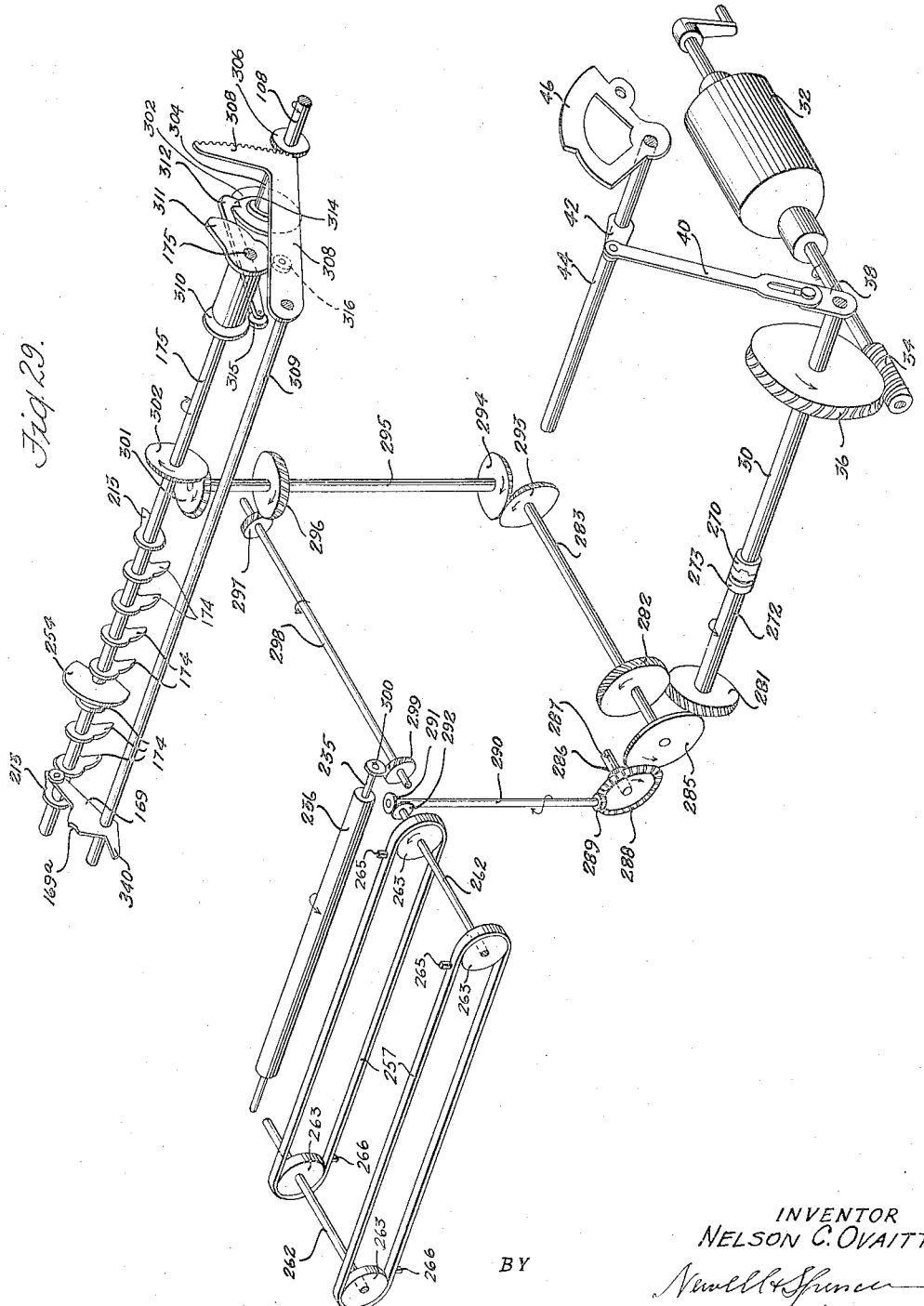

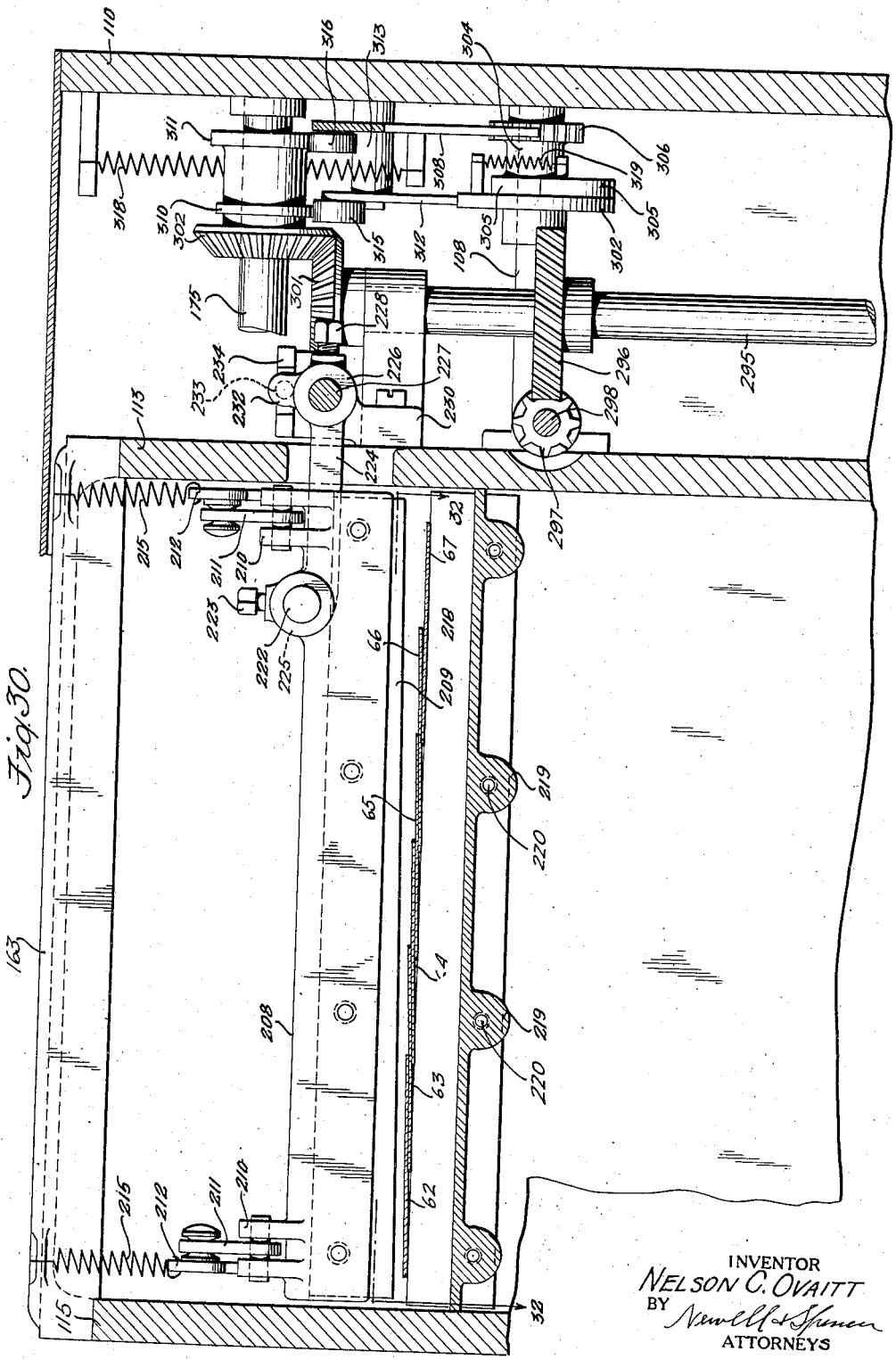

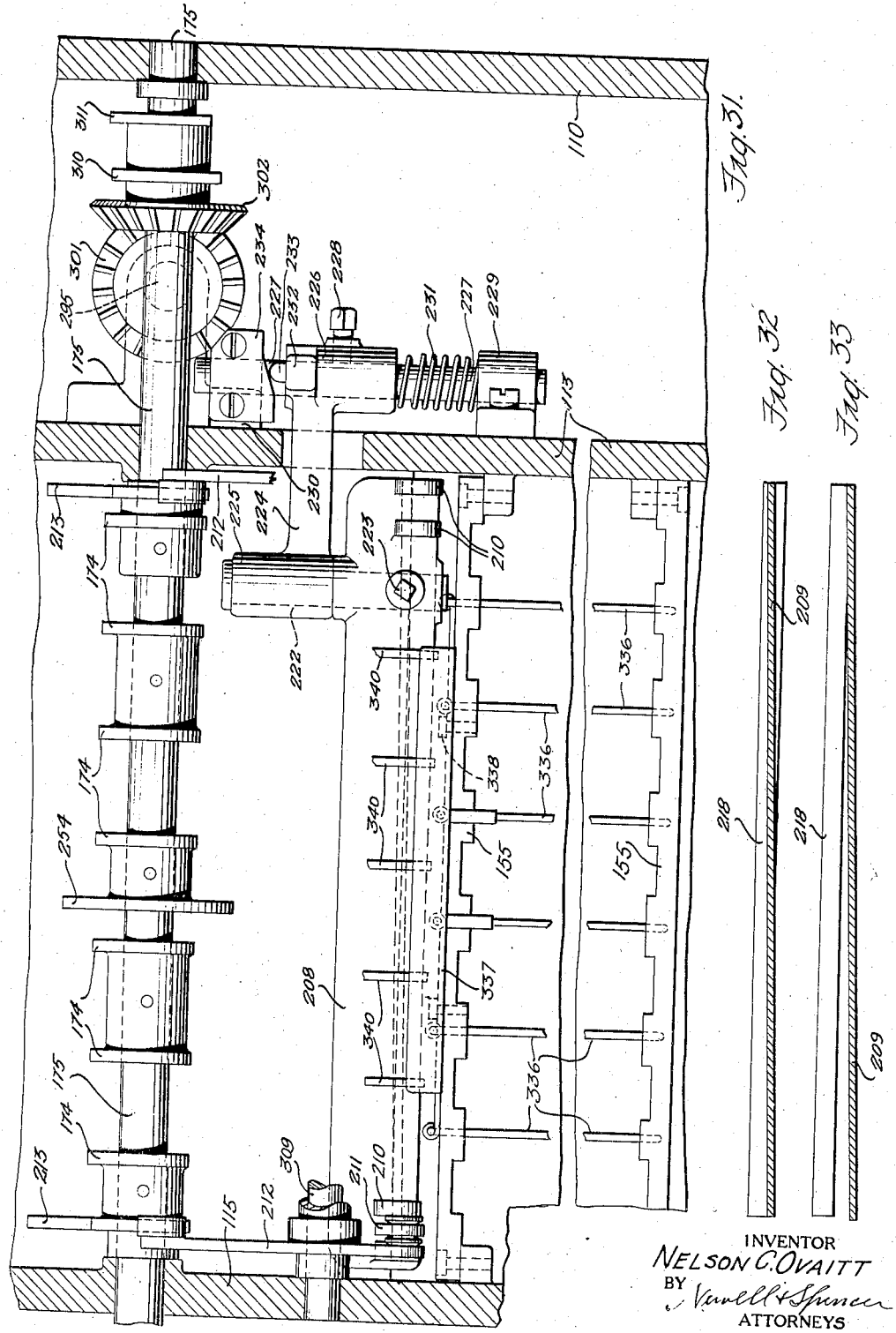

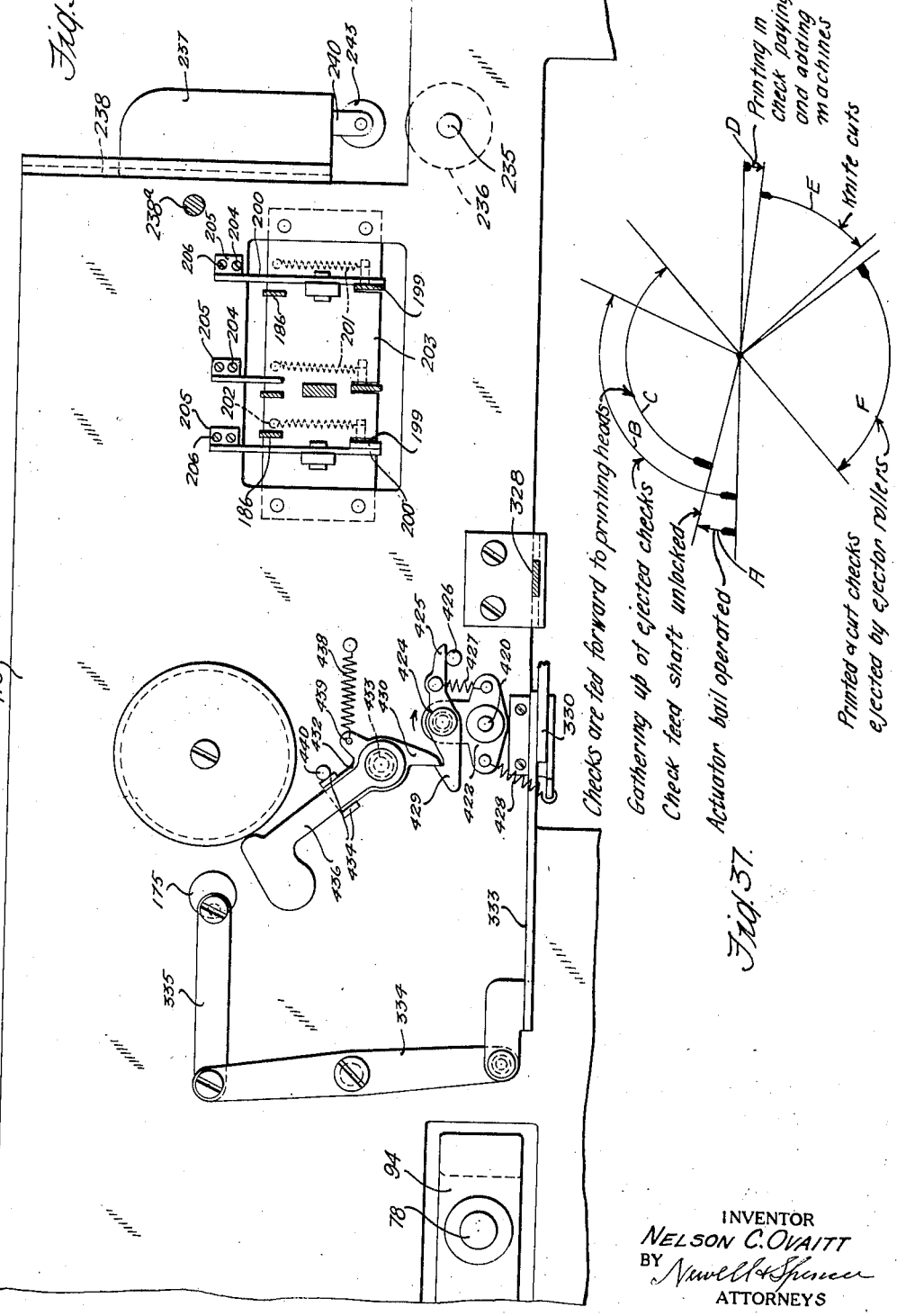

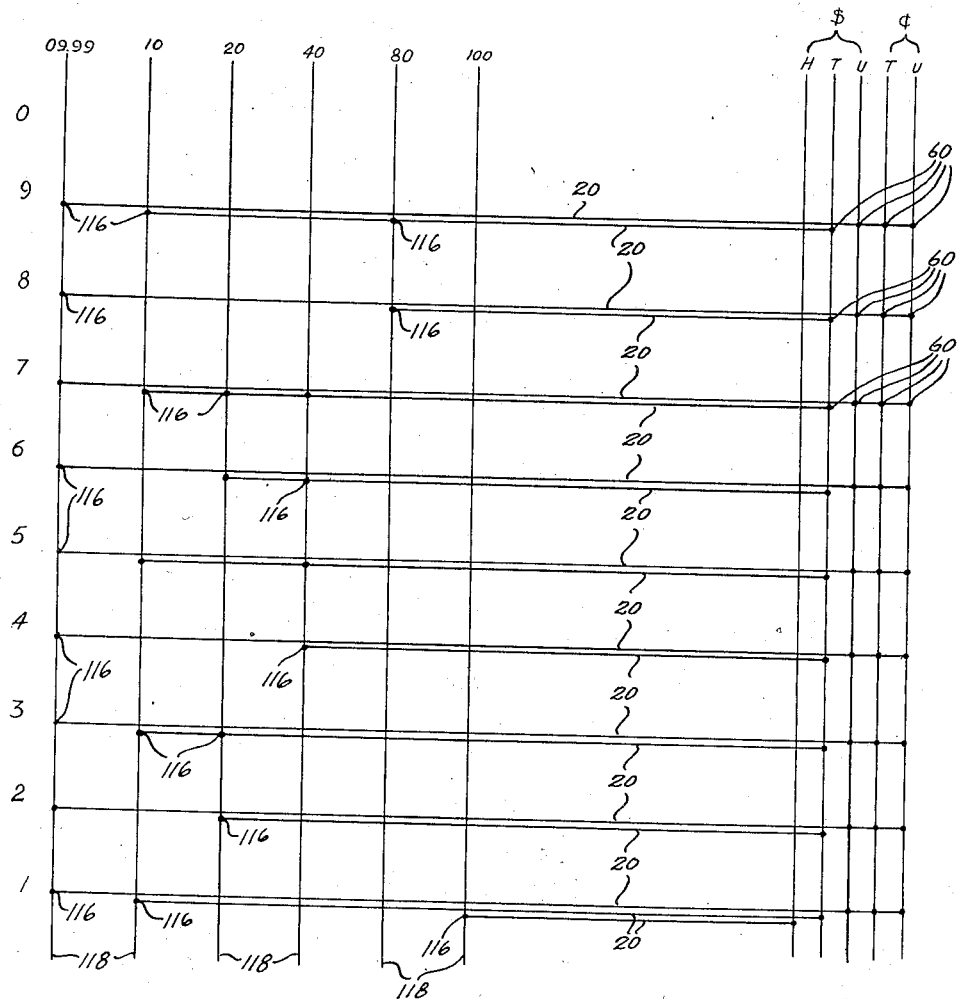

May 5, 1936. N. C. OVAITT 2,039,925
PAY ROLL CHECK MACHINE
Filed Oct. 21, 1930 29 Sheets-Sheet 25

INVENTOR
NELSON C. OVAITT
BY Newell & Spencer
ATTORNEYS

May 5, 1936.      N. C. OVAITT      2,039,925
PAY ROLL CHECK MACHINE
Filed Oct. 21, 1930      29 Sheets-Sheet 26

*Fig. 38*

DOE & DOE, INC.
PAY TO BEARER  NINE AND 31 ONE HUNDREDTHS DOLLAR
THIS CHECK PAYABLE AT CITIZENS NATIONAL BANK.
NOT VALID IF DRAWN FOR MORE THAN TEN DOLLARS. VOID AFTER THIRTY DAYS.
CHECK NO. U-14706   Aug. 30, 1930   John Doe  TREASURER

*Fig. 39*

DOE & DOE, INC.
PAY TO BEARER  FORTY DOLLARS EXACTLY
THIS CHECK PAYABLE AT CITIZENS NATIONAL BANK.
NOT VALID IF DRAWN FOR MORE THAN TEN DOLLARS. VOID AFTER THIRTY DAYS.
CHECK NO. V-01002   Aug. 30, 1930   John Doe  TREASURER

*Fig. 40*

DOE & DOE, INC.
THIS CHECK PAYABLE AT CITIZENS NATIONAL BANK.
PAY TO BEARER — TEN DOLLARS EXACTLY
VOID AFTER THIRTY DAYS.
NOT VALID IF DRAWN FOR MORE THAN TEN DOLLARS.
CHECK NO. V-01012   Aug. 29, 1930   John Doe  TREASURER INVENTOR
NELSON C. OVAITT
BY Newell & Spencer
ATTORNEYS

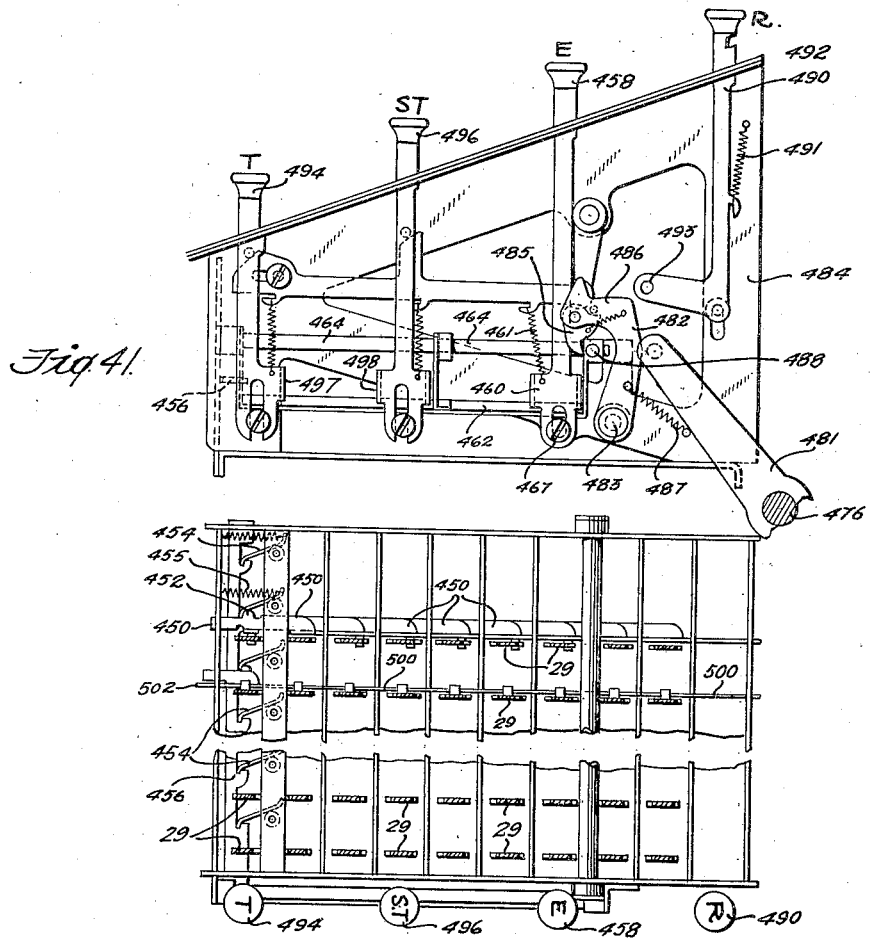

May 5, 1936.
N. C. OVAITT
2,039,925
PAY ROLL CHECK MACHINE
Filed Oct. 21, 1930
29 Sheets—Sheet 29
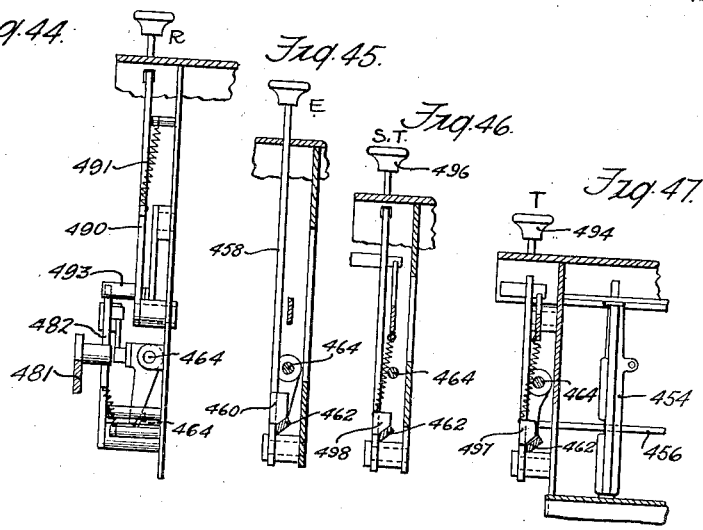
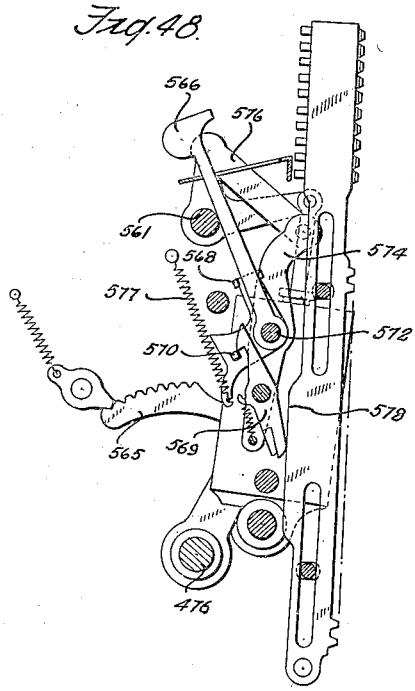
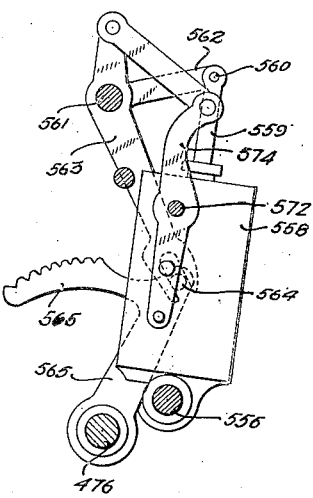
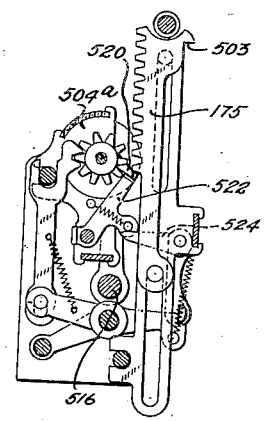
INVENTOR
NELSON C. OVAITT
BY
*Newell & Spencer*
ATTORNEYS Patented May 5, 1936

2,039,925

UNITED STATES PATENT OFFICE 2,039,925

PAY ROLL CHECK MACHINE

Nelson C. Ovaitt, Philadelphia, Pa.

Application October 21, 1930, Serial No. 490,153

26 Claims. (Cl. 235—60)

This invention relates to the art of payroll machines but does not properly fall within the category of any existing types.

Payroll machines of the prior art, of which I have knowledge, include many different kinds. The simpler type merely indicate the number of pieces of money—either specie or bills—of the various values or denominations which are necessary to make up a given amount. More complex types discharge the proper number of coins and/or bills, of the proper denominations, and the total for each payee is listed and added on an adding machine coordinated with the payroll section of the combined machine.

In all of these machines it is necessary to have actual money in bills or specie equal to the sum of the payroll, and the amount is usually withdrawn from the bank if not in a single sum at least in several sums, each of substantial amount. Payroll robberies have therefore become frequent, owing to the necessity of transporting large sums of money for payroll purposes.

Payment by check has been resorted to as a means to guard against robberies but such payment as heretofore practiced is open to several objections.

Where the community is small in comparison with the number employed in any business establishment, the burden of cashing checks is very great. The storekeepers object because they must keep an unusually large amount of cash on hand on pay days. The banks object, not only for the same reason but because it interferes with their usual business, and often requires the employment of additional help to handle payroll checks alone. In fact some banks require the paying company to increase their usual balance by a very large sum to compensate the bank for the extra service rendered in cashing the checks.

One of the objects of the present invention is to avoid money payments entirely and at the same time overcome the more serious, if not all, of the objections to check payments as generally practiced at the present time.

According to the present invention the amount to be paid is automatically split up into several checks of such denominational values that no difficulty will be experienced in having these cashed or exchanged for goods at neighborhood stores.

A further object of the invention is to increase the speed and ease with which a payroll may be made up.

The present practice with check payments requires a great deal of time in preparing the checks and if they are to be listed and the amount totaled, a separate handling is necessary.

The present invention requires only the setting of keys representing the amount to be received by a payee, and the pressing of a starting key. The machine will then issue at each operation one or more checks of aggregate value corresponding to the set up, each check having the date, amount and signature indicated thereon.

For instance, if the sum be paid to an employee is $49.31 this amount is set up and a $40 check and a check for $9.31 will be issued; or under a different adjustment either a $20 check, two $10 checks or four $10 checks will be issued instead of a $40 check.

The invention has many features of advantage a few of which may be referred to as indicating its scope and character.

An important feature of the invention resides in the provision of a plurality of rolls or parcels of checks, each check having a monetary value indicated thereon, together with printing mechanism for printing the date and the maker of the check, automatic means being provided for selecting one or more checks to be fed from one or more parcels of checks to the printing mechanism.

Another important feature of the invention resides in the provision of one or more rolls or parcels of checks having monetary values indicated thereon together with a roll or parcel of blank checks with means for selectively determining the issuance of one or more checks from the valuated parcels of checks, and a blank check, together with means for printing the amount on the blank check prior to the issuance of the checks. This feature enables a series of checks to be issued aggregating different amounts and preferably amounts under $10, are printed on the blank check. Amounts of $10 and multiples thereof are printed or otherwise indicated on the checks prior to their being placed in the machine, the only thing printed on such checks by the machine being the date and the signature of the maker.

A further feature of the invention relates to the coordination of check printing and check issuing mechanism with an adding machine whereby the amount set up on the keyboard of the adding machine is not only added and listed by such machine but connections from said machine lead to the check issuing mechanism and so control it that the value of the checks issued is equal to the amount added and printed by the adding machine. Sub-total and total mechanism enable the sub-total or total to be printed and means are also provided whereby with one setting of the adding machine keyboard a number of groups of checks aggregating the same value may be issued Another feature of the invention relates to the nature of the connections between the adding machine and the check issuing mechanism, such connections being such that they may be readily changed for connections of a different type to vary within wide limits the combinations of values of checks making up a definite sum. For example, instead of issuing one $80 check the machine may be readily changed to issue four $20 checks or a $40 check and two $20 checks, or a $40 check, a $20 check and two $10 checks.

The machine also embodies various other features associated with the main features of check selecting and issuing, such for instance as a mechanism for cutting off the checks after they have been fed to the printing mechanism and the printing operation performed; mechanism for ejecting the checks from the machine and for gathering up the checks into a pile or stack for convenient handling. These and various other advantages and features will become apparent from the following detailed description and claims when taken in connection with the accompanying drawings, in which Figure 1 is a top plan view of a combined payroll check machine and adding machine, the top plate of the left hand section being broken away;

Figure 2 is a transverse section on the line 2—2 of Figure 1;

Figure 3 is an enlarged view of the upper left hand portion of Figure 2;

Figure 5 is a longitudinal section on the line 5—5 of Figure 1;

Figure 6 is a longitudinal section on the line 6—6 of Figure 1;

Figure 7 is a transverse section on the line 7—7 of Figure 1;

Figure 8 is a section on the line 8—8 of Figure 7;

Figure 9 is a section on the line 9—9 of Figure 1 somewhat enlarged and showing the normal position of the operating means for feeding the checks to the printing mechanism;

Figure 10 is a view of the same parts in operated position;

Figure 11 is a sectional detail;

Figure 12 is a horizontal section taken on the line 12—12 of Figure 4;

Figure 13 is a vertical section on the line 13—13 of Figure 4;

Figure 14 is a vertical section on the line 14—14 of Figure 1 showing the position of parts after depression of the amount keys of the adding machine and after the selector bars have been moved to set position;

Figure 15 is a section on the line 15—15 of Figure 1 showing the parts associated with the printing mechanism for printing amounts of lower denomination as for instance less than $10;

Figure 17 is a section on the line 17—17 of Figure 18, showing the removable holder for printing the date and signer of the check;

Figure 18 is a top view of this holder;

Figure 19 is a bottom view thereof;

Figure 20 is a bottom view of a modified form of printing holder;

Figure 21 is a section on the line 21—21 of Figure 14;

Figure 22 is a section on line 22—22 of Figure 14;

Figure 23 is a section on line 23—23 of Figure 1, with some parts removed;

Figure 24 is a section on line 24—24 of Figure 1;

Figure 25 is a section on the line 25—25 of Figure 14;

Figure 26 is a sectional detail of mechanism for sounding an alarm to indicate exhaustion of a paper roll, Figure 16 showing the normal position of the same parts and Figure 26 the operative position;

Figure 27 is a section on the line 27—27 of Figure 25;

Figure 28 is a perspective view of the selector mechanism illustrating the position of parts when the amount $49.31 is set up on the keyboard of the adding machine;

Figure 29 is a perspective view of the power transmission mechanism;

Figure 30 is a section on the line 30—30 of Figure 15;

Figure 31 is a top view of the cam shaft and knife as they would appear if some of the intervening parts in Figure 1 were removed;

Figure 32 is a section on the line 32—32 of Figure 30 and showing the shearing mechanism for the checks in normal position with the stationary portion of the mechanism in plan;

Figure 33 is a similar view with the parts as they would be positioned at the completion of the shearing action;

Figure 34 is a section on the line 34—34 of Figure 1 showing the alarm mechanism and also some of the mechanism associated with the printing head for printing on the blank checks;

Figure 35 is a diagram illustrating the manner in which the keys of the adding machine select checks from different rolls or parcels of checks;

Figure 37 is a diagram illustrating the timing of the more important parts of the machine;

Figure 38 is a face view of a check such as may be used for values under $10;

Figure 39 is a check upon which values are printed prior to being placed in the machine;

Figure 40 is a check on which the amount is printed but at a different place from that shown in Figure 38;

Figure 41 is an elevation taken just inside the right hand frame plate and showing the mechanism associated with the special keys;

Figure 42 is a plan of the mechanism taken just inside the top plate of the machine and showing the key locking and release mechanisms;

Figures 44, 45, 46 and 47 are details showing the repeat, error, sub-total and total keys respectively;

Figure 48 is a detail of the printing mechanism just at the moment of the tripping of the type hammers. This view differs from Figure 6 in that the latter shows the normal position of the type hammers;

Figure 49 is a detail of the dash pot mechanism;

Figure 50 is a detail of the parts associated with the totalizer and adding racks.

Figure 4:
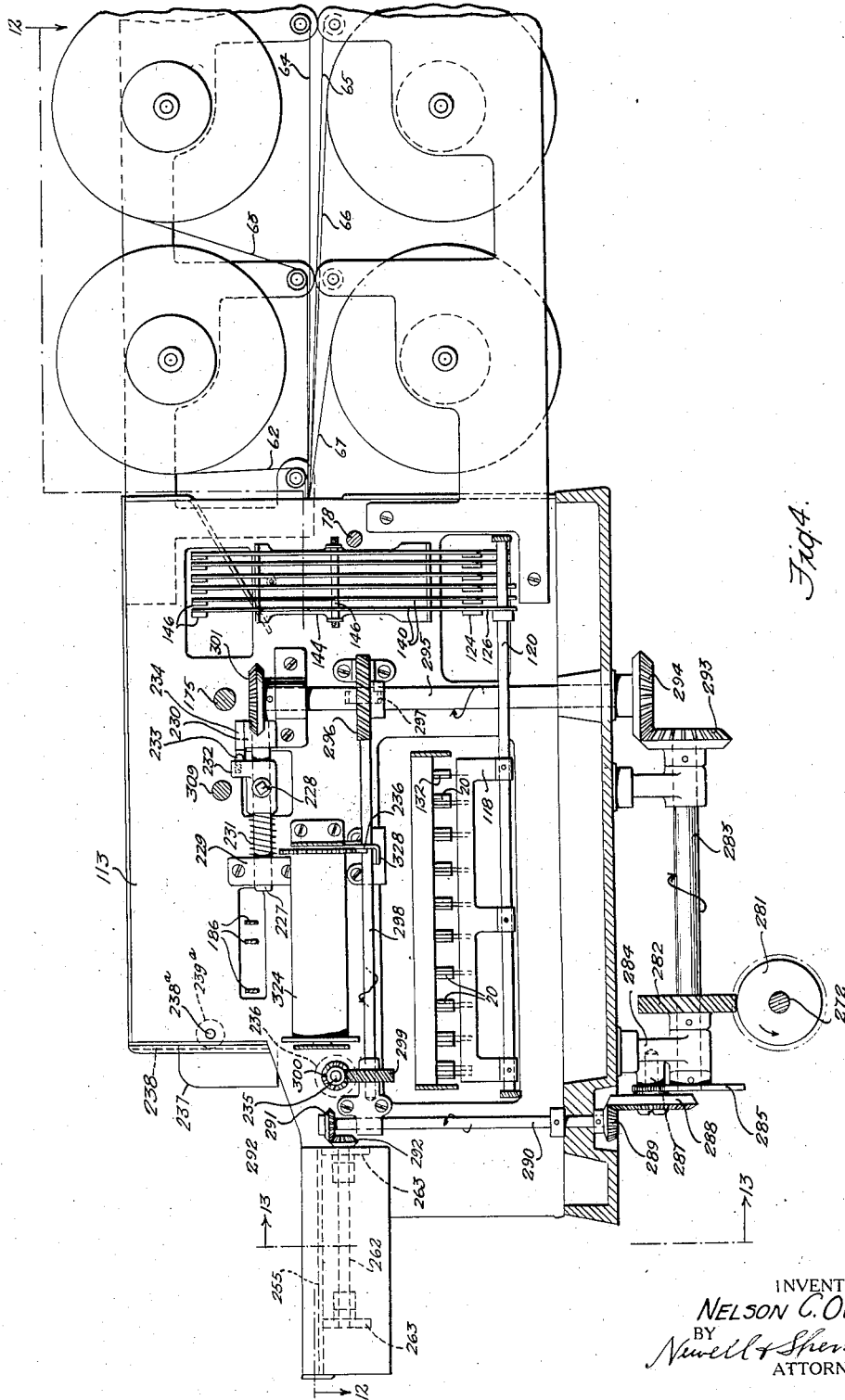
Figure 4 is a longitudinal section on the line 4—4 of Figure 2.

The machine about to be described in detail provides a series of instrumentalities coordinated for complete automatic operation to accomplish results so entirely new in the art that it will aid in an understanding of the mechanisms themselves to first give a very brief outline of the functions performed.

In making up a payroll with this machine the amount any payee is to receive is set up on a keyboard and a motor key depressed. The amount set up is entered on a totalizer and printed on a tally strip and the same amount also printed on an envelope upon which may have been previously printed the payee's name and any other desired data.

One or more checks aggregating the amount set up are automatically ejected from the machine ready to be placed in the envelope upon which the amount has been printed, these checks being automatically dated and signed by mechanism controlled by the set up and in some instances an amount is also printed on a check under the control of the same setting up devices.

If a number of payees are to receive the same amount there need be but one set up to accomplish this.

A total of the amounts of the checks that have been dated and signed may be automatically indicated at will.

While I have shown my invention in one practical embodiment as utilizing some of the features and mechanisms of an adding machine of known type, it is by no means to be viewed as a mere adding machine attachment. Rather it is to be viewed as a combined machine with the adding features arranged to be used separately when desired.

Referring to Figure 1 of the drawing, there is shown at the right a keyboard provided with keys 29 which control the check selection, date and signature printing and amount to be printed on a check.

This keyboard is shown to be such as is usual in adding machines of the key-set type and for convenience of disclosure the adding machine structure is substantially that shown in the patent to White, No. 1,192,721, July 25, 1916, and that to White et al. No. 1,723,263, August 6, 1929, with some modifications to be particularly referred to.

In addition to the function of adding and listing, the keys 29 are adapted to cooperate with selector bars 20, and as shown in Figure 6 these bars extend transversely of the adding machine and underneath the keys thereof. In the present invention these selector bars control feeding mechanism for feeding a check from one or from a plurality of rolls or supply parcels of checks and they also determine the operativeness of printing mechanism for printing on a check. By the mechanism which will be presently described in detail, the setting up of an amount on the keys 29 and the operation of a main shaft, causes one or more checks to be fed from rolls or supply parcels of checks together with the operation of printing mechanism to print the date and the maker's signature. At the proper time the checks are cut off by a knife and are fed out of the machine onto a table where they remain visible until the beginning of the next cycle of operation of the machine and are then automatically gathered into a pile. For instance if keys indicating $10 are depressed then a check will be fed from a roll of $40 checks, another check will be fed from a roll of $20 checks and a third check from a roll of $10 checks, the aggregate amount of the checks being equal to the amount set up on the keys 29 which may be designated as setting-up or amount determining devices. Amounts below $10 are taken care of in a special manner which will be described in detail hereinafter.

*Selector bars and cooperating mechanism*

The keys 29 of the adding machine are adapted to be held in depressed position by locking bars fully described and shown in said White patent and which are not specifically shown in the present embodiment. Therefore when a key is depressed it will depress one or more selector bars 20. These bars, as shown in Figures 2, 6 and 28, have a hooked portion 22 at their right hand end adapted to be engaged and moved longitudinally by an operating bail 47. The initial action of the keys is merely to move one or more selector bars 20 into position so that their hooked ends are in the path of said bail 47, which bail is operated upon the pull of an operating handle or as in the present machine upon the depression of a motor key 24 shown in Figures 1 and 2.

The motor key has a stem 26, Figures 2 and 6, which is connected at its lower end with a crank 28 operating a clutch device such as is usual in adding machines, said clutch device being so constructed as to give one rotation to a shaft 30, Figure 7, upon each operation of the motor key. The motor is shown at 32, Figure 6, and its shaft carries a worm 34 meshing with a worm gear 36 on the shaft 30. At its outer end the shaft 30 carries a crank having a pin engaging in a slot in a pitman 40 whose upper end is pivoted to a crank 42 on the adding machine shaft 44 supported in the side frames of the machine as indicated in Figure 7. As shown in Figure 5 the shaft 44 carries a cam 46 by means of which the bail 47 is operated. For this purpose a shaft 48 is supported in end frames 50 and carries an arm 52 having a hole near its outer end, Figures 5 and 7. The cam 46 engages a roller 49 of a lever 51 pivoted on a shaft 53 to which a link 54 is in turn pivoted. A pin 55 on the end of this link enters the hole in the arm 52 thus transmitting movement of shaft 44 to shaft 48 and hence to bail 47. The link 54 is adapted to be swung to disconnect the pin for a purpose to be later described.

The selector bars 20 each have one or more projections 60 for cooperation with the lower portion of the key stems and when keys are depressed to set up an amount the proper selector bars will be depressed and held so by reason of the fact that the keys are latched down by the usual latches found in adding machines of this type.

It will aid in a better comprehension of the functions and operation of the various parts if a definite key setting is assumed and it will be supposed that keys 29 are depressed representing the value of $49.31. The depression of the 4 key in the tens column of dollars will result in depressing one of the selector bars under this key as shown in Figure 6. The other selector bar under the 4 key will not be depressed because there is no projection 60 on the second selector bar. The 9 key in the units of dollars column will result in the depression of one of the selector bars associated with that key. Depression of the 3 key in the tens of cents column will also result in the depression of one selector bar as will likewise be the case in the units column for the one key. Upon then depressing the motor key the bail 47 is rocked by the mechanism above described and those selector bars which have been depressed will have their hooks 22 positioned over the bail 47 and will be drawn over by it to the positions shown in Figure 28.

The selector bars operate to determine the feeding forward of one or more checks and they also operate to determine the operativeness of printing mechanism for printing on the selected checks the maker's name and the date. In the case, however, of amounts less than $10, as shown in the present disclosure, the amount of the check is also printed and the printing mechanism not only selected for operation but the amount to be printed is set up on separate printing devices which are under the control of the amount keys of the adding machine. For instance in the particular example, a check would be selected from a roll of blank checks and the amount $9.31 printed thereon in addition to the date and maker's signature.

*Check supply means*

The checks may be supplied from rolls or they may be supplied from checks connected together in fan fold form. In the present embodiment six rolls of checks are designed to be used but the number of rolls or supply parcels of checks is not limited to this number. In Figure 4, four rolls of checks only are shown but the webs of six checks are shown in Figures 1 and 12, these webs overlapping one another in order that the space occupied by the several checks may not need to be so great and also for the reason that after the checks are fed forward and printed upon they are ejected onto a table and are subsequently automatically gathered up. When there is some overlap the gathering up operation is made more certain. Referring to Figure 4 the topmost web of checks 62 is fed from the upper left hand roll, the next lower web 63 being fed from the roll to the right and the lowest web 67 being fed from the lower left hand roll. The particular check web selected is fed forward the length of one check and for this purpose the web is perforated along one edge as shown at 68, Figures 38 to 40. These perforations in the web are adapted to be engaged by projections 70 on a sprocket chain 72, Figures 14, 15, 16 and 27. Each sprocket chain is driven by a sprocket wheel 74 and over an idler 76 mounted loosely on shafts 78 and 80 respectively.

There is a set of sprocket wheels 74 and 76 for each check web and all of these together with their shafts are so supported that the entire structure may be removed from the machine as a unit. For this purpose side plates 82 and 84, Figure 27, form a framework for supporting the removable parts. These side plates are connected together by a relatively wide plate 86 and also by three bars 87, 88 and 89, shown in Figures 14, 15 and 16. In Figure 25 is also shown the plate 86 and the bar 88. In addition to the parts just described there is also provided a slotted plate 90 which forms a bed over which the checks are fed. The slots are wide enough to accommodate the sprocket chains which lie in the plane of the bed while the projections 70 extend above the bed and through the perforations in the check web. The shaft 78 is supported from two brackets, one on either side of the machine, and extending downwardly and rearwardly from the plate 86. Both brackets are shown in Figure 27, the right hand one 92 having a bushing 93 through which the shaft 78 projects, while the left hand bracket 94 supports the other end of the shaft in a suitable bearing. This bracket 94 is also shown in Figure 15. The shafts 80 are stub shafts and each is supported by a separate bracket 96 which includes a plate 98 suitably slotted and adjustably secured to the plate 86 by screws 100 as indicated in Figure 14, such construction being provided to enable the sprocket chains to be kept at the proper tension.

Referring to Figures 24 and 27 the shaft 78 is shown as projecting beyond the bushing 93 and keyed to it is a driving disk 102 having a laterally projecting tooth 104 which engages a notch in a disk 106 keyed to a driving shaft 108 supported in the central frame plate 113 at its left hand end, its right hand end being supported by the frame plate 110 as shown in Figure 1. The tooth and notch construction permits the shaft 78 and the parts supported by the side plates 82 and 84 to be removed as a unit, without disturbing the shaft 108.

For the present it will be sufficient to state that through connection from the adding machine motor 32 the shaft 108 is given one complete rotation immediately after the bail 47 has been moved to position the selector bars 20, and by mechanism which will now be described checks from rolls which have been selected by the selector bars are fed forward to printing mechanism and are afterwards severed and further fed onto a table where they remain visible until the beginning of the next cycle of operation of the machine.

It will now be in order to described the mechanism which determines which web of check material is to be fed to the printing mechanism.

The sprocket wheels 74 are all loosely mounted on shaft 78, Fig. 24, and to enable any wheel to be rotated by the shaft, the latter is provided with a number of collars 112 pinned thereto, there being one collar to the left of each wheel 74, the second one from the left being shown in section to illustrate the pin. These collars therefore turn with the shaft upon every rotation thereof. The collars are notched at opposite points in their circumference at 113a, Figures 14 and 24. Slidable on the shaft 78 are a series of clutch members 114 each having a projection 115a for engagement with the notch 113a of the collar 112, and a spline 117 in constant engagement with the adjacent sprocket wheel 74. Any sprocket wheel may thus be clutched to the shaft 78 to be rotated thereby by sliding its associated clutch member 114 to the left, Figure 24.

It will be remembered that the keys 29 representing $49.31 have been depressed. In Figure 28 the bars 20 representing this amount are shown in their operated position. Referring again to that figure it will be noted that the bar 20 corresponding to the 4 key is provided with a downwardly projecting lug 116 and that said lug is shown as having rocked a bail 118 about its axis. This bail 118 is supported by a shaft 120 having at its forward end a crank 122, Figure 24, connected by a link 124 to an arm 125 secured to a shaft 128, Figure 26, supported on two bars 130 extending between the machine frames as shown in Figure 24. Shaft 128 carries a second arm 126 whose upper edge is formed with projections fitting into grooves in the clutch member 114. Arm 126 is also provided with a lug 127 which normally enters a notch in its associated wheel 74 to lock it from movement. The movement of selector bar 20 controlled by the 4 key has, through the mechanism just described, resulted in the rendering operative the clutch 114 corresponding to that sprocket wheel 74 identified with the check web 65 for issuing a $40 check. The lug 127 is shown free from the notch in wheel 74 permitting it to turn with the shaft 78.

The selector bars corresponding to the 9, the 3 and the 1 key have also been moved but only two checks will be issued, one for $40 and one for $9.31. The 9, 3 and 1 keys all act on the same bail 118 for reasons to be presently explained.

At this point it is desirable to refer to the arrangement of the printed matter on the check webs and for this purpose reference is made to Figures 12 and 24. The check web 62 at the left as shown in Figure 12 contains blank checks, that is to say they do not have any amount previously printed thereon, nor do they bear the date and signature.

In the particular embodiment of the invention chosen for illustration six rolls of checks are used and while the left hand roll is a roll of blank checks, meaning thereby checks which do not have the date, amount or signature thereon, the remaining rolls of checks each have printed thereon an amount which in the present example is $10 for the roll of checks to the right of the blank roll, the succeeding rolls having printed thereon the amounts $20, $40, $80 and $100 respectively, but these checks do not have the date and signature printed thereon. In the specification and claims the term "blank check" is applied to the left hand web of checks while the other checks are referred to as having monetary values indicated thereon. All of the checks have printed or otherwise indicated thereon the name of the firm, individual, or corporation issuing them, together with the name of the bank, and other identifying information, such as shown on the checks depicted in Figures 38 to 40. It is intended that the checks shall be made payable to bearer as this makes them more easily cashable by the receiver, but this is a matter dictated by convenience or business or legal requirements. In the illustrated embodiment it is intended that for the payment of a sum of money equal to $49.31, the example chosen, two checks shall issue—a check for $40 and another check for $9.31. It will therefore be necessary to feed a check from the roll of $40 checks and from Figure 12 it will be seen that this roll is the fourth roll from the left. The other check will be issued from the first web at the left designated as the roll of blank checks and this latter check at a later stage in the operation, to be presently described, will have printed thereon the amount as well as the date and signature of the maker. The $40 check issued from the fourth roll from the left, Figure 12, will have printed thereon the date and the signature of the maker. Preferably all these printing operations occur simultaneously.

It will be understood that for the purpose of issuing checks to the amount chosen the first sprocket chain to the left must be actuated to feed forward a blank check and the fourth sprocket wheel from the left must be likewise actuated to feed forward a check from its roll or parcel of checks and in Figure 24 the first and fourth clutches 114 are shown in position to clutch their respective sprocket wheels to the shaft 78 so that when said shaft is given a complete rotation by mechanism to be later described a check from each of these rolls will be fed forward. Referring now to Figure 28, the selector bar 20 corresponding to the three key likewise has a projecting lug 116 and this is shown as having rocked the bail 118 for moving the proper clutch 114 for connecting the left hand sprocket to the shaft 78. It will also be noted that the projection 116 on the selector bars 9 and 1 also operates on the same bail 118 so that the left hand sprocket wheel is the only one selected by all of these three selector bars.

All of the bails 118 are returned to normal position by a single return bar 132 having lugs 134 suitably positioned to engage each of the bails 118 and return them to normal. The bar 132 is notched at its right hand end as shown in Figures 2 and 28 and engages over the bail 47 and is moved in both directions by it, the engagement being permanent.

The bail itself is returned to normal by a spring 133, Figure 2, engaging an arm 135 projecting from the bail shaft 48, a stop limiting the action of the spring.

The selector bars are all guided at their left hand ends by a rod 136, the selector bars being suitably notched as shown to engage said rod. They are guided also by a series of combs suitably spaced as indicated at 137, Figure 2. The springs 139 hold the bars in their upper normal position against a stop rod 141. Overthrow of the bars is prevented by a lug 143 on the lower edge of each bar while lugs engage the intermediate comb plate 137 when the bars move to the right.

Although in the embodiment of the machine illustrated, six rolls of checks are intended to be used it is to be understood that a greater number of rolls may be employed and selector bars 20 increased in number correspondingly. The selector bars likewise may have the projections 60 differently arranged. This flexibility of the machine will be better understood after the mechanism for selecting the particular printing head has been described.

*Check printing selector mechanism and type heads*

The selector bars 20 perform a double function. They not only determine from what roll or parcel of checks, a check is to be fed but they also determine the operativeness of printing mechanism to print on the selected check which has been fed forward for this purpose. Checks which are fed from the rolls of valuated checks, that is to say those which already have a monetary value indicated thereon, are fed to a printing head which prints the date and signature of the maker. Any check fed from the roll of blank checks, however, will have printed on it in addition to the date and signature of the maker, the amount of the check as well.

It has been described how the selector bars operate bails 118 which are connected to links 124. Each of these links 124 carries a pin which is engaged by the forked end of a lever 140, all the levers being supported on a shaft 142 carried in a frame 144 spaced from the central frame of the machine as shown in Figure 24. Six links 124 and six levers 140 are shown in the present embodiment. To the upper end of each lever 140 is connected a link 146. Each link 146 except the uppermost one, as shown in Figure 1, is connected to a bell crank 148, the uppermost one being connected to the two left hand bell cranks as shown in Figures 1 and 24. Due to the fact that the check webs overlap it is found convenient to arrange for the printing of the maker's signature and date on the free portion of the overlapped checks. The extreme left hand check, however, has its entire surface free and it is printed on at two places and two printing heads are provided, and both of these must be selected when a blank check is fed forward. It is therefore necessary that both heads be rendered active at this time and consequently the selector bar 20 which selects the left hand check web for feeding also selects the two left hand type heads for printing. There are therefore seven type heads and seven bell cranks 148. Figure 24 illustrates the position of the active bell cranks 148 for printing the maker's signature and the date on the $40 check which is fed forward and for also printing the amount, the maker's signature and date on the blank check which is likewise fed forward.

Referring to Figure 2 it will be noted that there are seven printing heads mounted between the plates 113 and 115. The six heads to the right are exactly alike and are indicated by 150. The seventh or extreme left head 152 is designed to print the amount on the blank check and its construction is quite different from the others.

Figure 16:
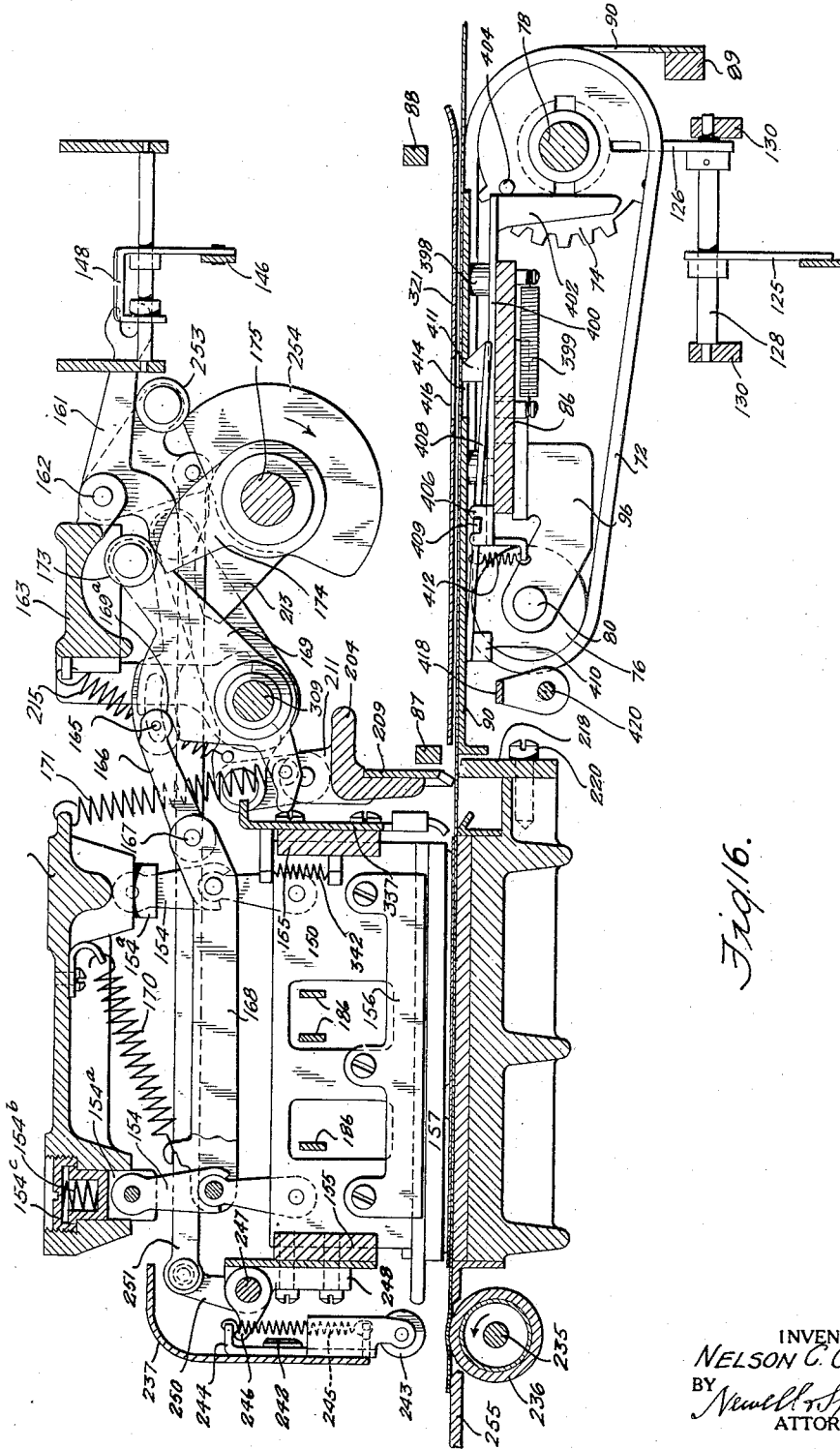
Figure 16 is a view similar to Figure 14 but showing the parts in position to print.

As shown in Figures 14, 15 and 16 each printing head 150 is supported from a bracket 153 by toggle links 154 by means of which the printing head is reciprocated from normal to printing position, guiding members 155 secured to the side frames 113 and 115 being provided to hold the heads in proper alignment. As shown in Figure 21 the printing head is made up of a central block having a plate 156 secured to each side thereof, said plates being bent slightly at their lower portions to receive a printing type holder or slide 157. This holder is shown in section in Figure 17 and carries movable type 158 for printing the date. It also carries a strip 159 which may be secured by screws as indicated in Figure 19, which strip carries the signature of the maker. Figure 20 shows a modified form of printing holder whereby the amount of a check may also be printed by a separate strip secured to the slide. The slide 157 has beveled upper portions as shown in Figures 21 and 22 enabling it to be inserted longitudinally between the lower inwardly projecting portions of the plates 156 whereby it is securely held in printing position. The left end of the holder is provided with an aperture 160 enabling removal of the holder by means of a hook or other suitable device in order that the holder may be changed when it is desired to change either the date or the signature or both.

It has been previously mentioned that the set up on the keyboard of the adding machine of the amount $49.31 has caused movement of the third bell crank lever 148 from the right, Figure 24, and the two leftmost bell cranks.

It will now be described how these bell cranks render the respective printing heads effective.

Referring to Figure 14 there is shown a lever 161 pivoted on a shaft 162 carried by a bracket 163. There is one lever 161 for each bell crank 148. The right arm of each of these levers is forked to engage a bent-over portion of its associated bell crank 148 and its left arm is slotted for the purpose of engaging and guiding a pin 165 projecting from a link 166 pivoted at 167 to a bar 168 which bar connects the toggle levers 154. The purpose of the construction above described is to enable any bell crank 148 to position the end of a link 166 in the path of a shoulder or notch 169a of a printing control lever 169, see Figures 14 and 29. The printing control levers are all supported on the shaft 309 carried by the side frames of the machine. A spring 170, one for each printing head, is connected to a hook secured to the bracket 153 at one end and to a hook in the bar 168 at the other, and each spring acts to brake its toggle and to elevate its printing head and hold it in normal position. A spring 171 of which there is also one provided for each printing head, is connected to the bracket 153 at one end and to a pin 172 on the printing operating lever 169 to hold said lever normally with its roller 173 in contact with the printing cam 174 mounted on cam shaft 175. It will be later described how this shaft is given one complete rotation at the proper time during the cycle of operation of the machine to enable the cams carried thereby to perform various functions. The cam 174 of which there is one provided for each printing head, when moved from the position shown in Figure 14 to the position shown in Figure 16, moves the lever 169 associated therewith and causes the toggle levers to be straightened and the printing head moved to its lowermost position. Previous to this time a check has been fed to a position under the printing head and receives the impression therefrom by means of inking ribbon whose construction and operation will be later described. When the cam shaft operates the cams 174 it causes all of the levers 169 associated with their respective cams to be moved but only those printing heads that have been rendered operative by the movement of the link 166 will be operated to print. Both printing heads 152 and the next adjacent head 150, Figure 2, will be operated to print on a blank check, the printing head 150 printing the date and maker's signature only while the printing head 152 prints the amount only where this amount is less than $10. In the particular example which has been chosen for illustration the amount printed by the printing head 152 is $9.31 and this would appear on the check as indicated in Figure 38 and would read "nine and 31 one hundredths dollars". The dollars and tens and units of cents are printed from movable type members while the words "one hundredths dollars" is preferably printed on the checks before they are put into the machine.

The means whereby the movable members of the printing head 152 are set from the adding machine keyboard will now be described.

Referring to Figure 6 the shaft 44 carries levers 176 which are notched at either end, the left hand end engaging pins on the adding rack bars 175 while their other ends engage pins 177 on type bars 178, see also Figure 7. These type bars carry type at their upper ends which are driven against a platen by type hammers whose general operation has already been referred to, the amounts being listed on a tally strip. In this machine provision is also made for printing the amount of each payee on an envelope which may be inserted in an envelope holder shown at 178a, Figures 1 and 7. Since the aggregate value of any series of checks in the illustrated embodiment is within the hundred dollar range, provision is made for printing only in the first three denominations of dollars, and for this purpose the five rack bars 178 to the right as shown in Figure 7 are adapted to transmit their set up to rack bars which print on the envelope. Transverse shafts 180 are suitably supported in the framework of the machine and each shaft at its left carries a pinion 189 and at its right a pinion 181, the pinion 189 engaging the teeth of rack bars 178 while the pinions 181 engage teeth of the auxiliary envelope printing rack bars 182. In this way the set up on the rack bars 178 is transmitted to the bars 182. The three lower shafts 180 extend leftwardly beyond the central supporting frame plates and over to the left hand frame plate of the adding machine and near their left end each shaft is provided with a pulley 183 to which is attached one end of a flexible but substantially inelastic cable 184, the cables passing over guide pulleys 185, Figures 1 and 7, and beyond the pulley 185 each cable connects with a rack bar 186 shown in enlarged detail in Figure 3. The left end of this rack bar is provided with a hook 187 to which is connected a spring tape 188 wound about a drum 189 provided with a ratchet 190 and a pawl to hold the spring tape at the desired tension. These spring tapes constantly tend to pull the rack bars 186 towards the left as viewed in Figures 2 to 3, the force of these springs being sufficient to rotate the printing wheels of the printing head 152. The power required, however, is not great and the spring tapes are normally overcome by the more powerful springs which normally restore the adding machine parts to normal position, that is in the position shown in Figure 6, with the type carrier rack bars 178 in their lowermost positions. When, however, an amount is set up on the adding machine keyboard and the type carriers 178 elevated according to the position determined by the set keys, the spring tapes 189 move the rack bars 186 as far as permitted by the corresponding movement of the type carriers 178. The printing head 152 is shown in end view in Figure 3 while Figure 15 shows the same in longitudinal section. A shaft 192 supports the various elements forming the printing unit. At the right it is provided with a pinion 193 with which the rack 186 identified with units of cents, engages. Next to the left and secured to the pinion 193 is a disk 194 carrying numerals from 1 to 9 for printing units of cents and adjacent this is another similar disk 195 for printing tens of cents. This disk carries numerals 1 to 9 but the zero is omitted. A pinion 196 is secured to the wheel 195 and the tens of cents rack 186 engages this pinion. The dollars are printed by words rather than figures and for this reason a drum 197 is provided. The dollars drum has the word "No" in zero place followed by the "one", "two", "three", etc., and preferably the word "and" appears after each inscription. The disk 197 also has secured to it a pinion 198 with which the rack 186 identified with dollars, is connected. Normally the printing head 152 is in the position indicated in Figure 2 with each of the pinions 193, 196 and 198 engaged with their respective rack bars 186.

At this time the pawls 199 are not in engagement with the wheels as indicated in Figure 2. These pawls are normally urged upwardly by springs 201 secured to a pin 202 projecting from a plate 203. The plate has cut out portions through which the pawls 199 extend and a shoulder on the plate limits the movement of the pawls under the influence of their springs but when the wheels are moved downwardly they engage the aligning teeth of the dogs before they disengage the teeth of the rack bars 186. The dogs are supported by arms 200 which are capable of a slight movement about a supporting pivot for the purpose of accurately positioning the dogs so that the alignment of the wheels is accurate. For this purpose a set screw 204 is in screw threaded engagement with a lip 205 projecting from the upper part of the arm and bears against the side plate 115. A second screw 206 passes loosely through a slot in the lip 205 and is screw threaded into the plate 115. By adjusting both screws in proper coordination the dogs may be moved slightly backwardly or forwardly to properly align their engaged wheels.

Thus far the operation of selecting the check roll from which a check or checks is to be fed has been described and the means for printing on a selected check. In the example given a check for $40 and a blank check have been fed forward under the printing heads. Figure 16 shows a check in position with the parts operated to make a printing impression.

Sometimes there will be two layers of check material under a printing head and sometimes only one layer. To compensate for this the toggles 154 are yieldingly supported in the bracket 153, Figures 14 and 16. Each bracket has two recesses, only the left one, however, being shown in Figure 14. Into each recess there is slidably mounted a cup member 154a to an ear of which is attached the pivot of the upper link of each toggle 154. The cup member is shouldered as is also the recess to thereby limit the downward movement of the toggles and a spring 154b is interposed between the cup member and an adjusting screw 154c. The springs 154b allow of a slight give to the printing head to allow for different thicknesses of check material printed on.

From the foregoing it will be apparent that the set up of $49.31 on the keyboard of the adding machine will result in feeding forward a $40 check and a blank check. On the $40 check will be printed the date and maker's signature. On the blank check there will be printed the amount $9.31 in addition to the date and signature.

If the amount set up had been $72.48 then with the number of check webs and printing heads shown, there would be issued a $40 check, a $20 check, a $10 check and a check for $2.48.

It has been suggested that other arrangements are fully within the spirit and scope of the invention, and that great flexibility is possible.

Figure 36:
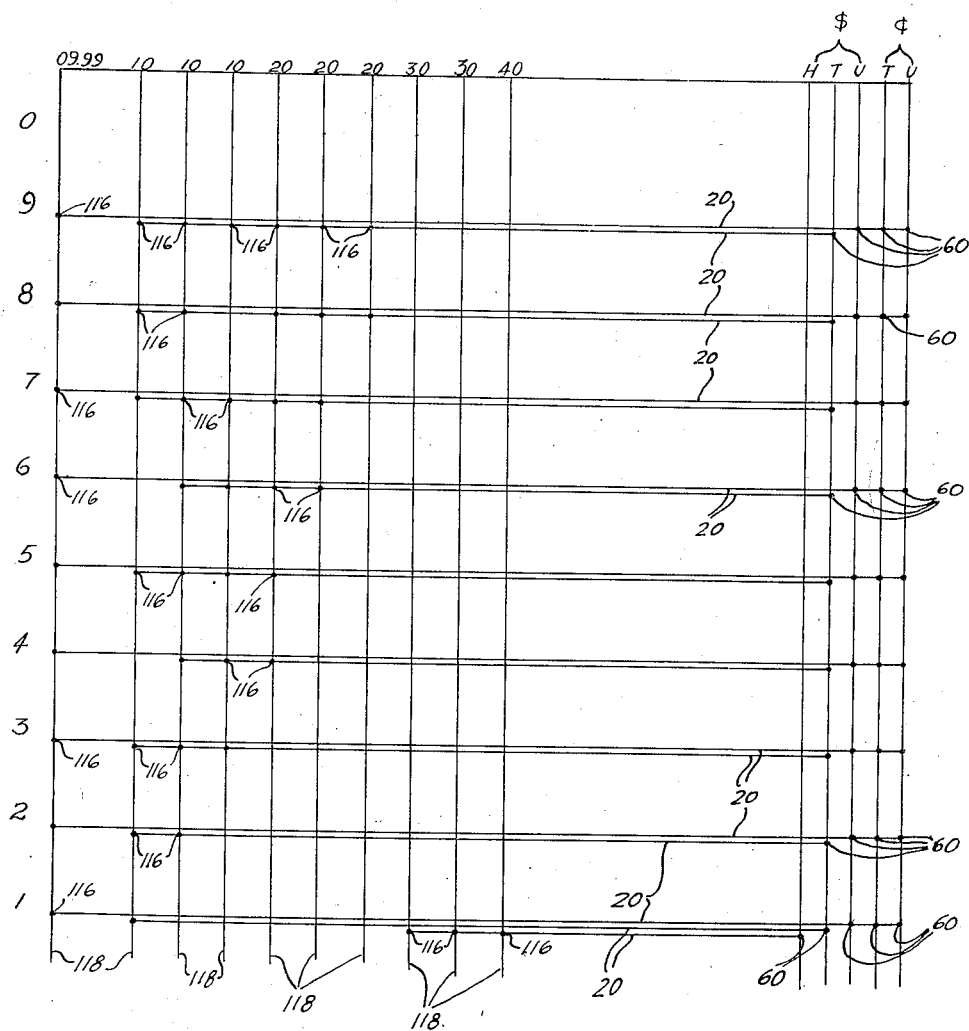
Figure 36 is a similar diagram showing connections to check rolls having smaller monetary values from those shown in Figure 35.

This flexibility of the machine will be best understood by referring to Figures 35 and 36 which represent in a diagrammatic way the action of the amount keys 29 on the selector bars and the selection of the check webs.

In Figure 35, beginning at the right, the first five vertical lines represent rows of amount keys from units of cents up to hundreds of dollars. The horizontal lines represent the selector bars 20.

The six vertical lines at the left represent check values. In this arrangement checks for $100, $80, $40, $20 and $10 may be selected from the respective rolls of valuated checks. Checks for less than $10 are fed from the roll of blank checks at the left and any amount from 1¢ up to $9.99 may be printed on a check issued from this roll. Since the printing head 152 must be actuated whenever any key in units or tens of cents or in units of dollars, is depressed, any one of these keys must actuate a selector bar 20. Therefore one selector bar of each pair of selector bars for the keys from 2 to 9 has a projection 60 in those orders of keys. The other selector bar of each of these pairs is operated whenever any key in tens of dollars from 2 to 9, is depressed. The 2 key in tens of dollars, for instance, controls the issuing of a $20 check: the 3 key in this order will issue a $20 check and a $10 check. The 5 key will issue a $40 check and a $10 check.

The row of 1 keys have a third selector bar 20 and this is used to select a $100 check.

The capacity of the machine as illustrated in Figure 35 as measured by the aggregate value of the checks issued at one operation, is $199.99. It is obvious that a third selector bar could be provided in one or more rows above its 1 row of keys and the capacity increased.

In Figure 36 an arrangement is shown, by which the denominational value of the checks is smaller but a greater number are issued to make up an amount, although the total capacity is the same as in the arrangement shown in Figure 35. In the Figure 36 layout the highest value check is $40 and the greatest number of checks will be issued under control of the $70 key. As shown, said key will cause the issuing of two $20 checks and three $10 checks. In this arrangement ten rolls of checks are needed, nine rolls of valuated checks and one roll of blank checks. Other elements would likewise have to be duplicated to correspond.

It will now be in order to return to the description of the mechanism for further handling of the checks after they have been printed.

Immediately after the checks are printed they are severed by a knife and are then fed out from under the printing heads onto a belt conveyor. Figure 12 indicates the position of the two checks which have been fed forward and is similar in this respect to Figure 16. The mechanism for severing the checks and feeding them onto the conveyor belts and the construction of the conveyor belts will now be described.

Check severing mechanism

The mechanism for severing the checks is located just to the rear of the printing heads and includes a supporting frame member 208, Figures 14, 15, 16 and 23. This member carries a knife 209 which is shown in normal position in Figures 14 and 15 and in the position about to sever the checks, in Figure 16. The completion of its movement is depicted in Figure 23.

The member 208, Figure 30, is provided with ears 210 at each end thereof for the reception of a pivot pin which passes through one end of the link 211, the upper end of each link being connected to a knife operating lever 212 mounted on the shaft 309 which supports the levers 169. Two cams 213 spaced apart as indicated in Figures 29 and 31 operate to move the knife from the normal position shown in Figure 30 to its operated position against the tension of the springs 215, Figure 30. The checks to be severed, as shown in Figure 16, project over the edge of a stationary cutter 218 which is secured to lugs 219, Figure 30, projecting from the base by screws 220, Figures 14 to 16. It is desirable that the checks be severed by a shearing action of the knife. In order to maintain the knife correctly in contact with the cutter 218, at the cutting point throughout the entire stroke of the knife it is desirable that the knife edge be slanted in a longitudinal direction and be permitted to move outwardly during the cutting stroke. This action of the knife is shown in Figure 32 which shows the left hand portion of the knife engaging with the edge of the cutter 218 at the extreme left, while Figure 33 shows the extreme right hand portion of the knife in engagement with the edge of the cutter when the knife has reached the completion of its down stroke.

The mechanism for holding the knife in yielding contact with the cutter is shown most clearly in Figures 30 and 31 and includes a stub shaft 222 secured in the member 218 by a screw 223.

An arm 224 is provided with a sleeve 225, Figure 31, which fits over the projecting end of the shaft 222, said arm also having a sleeve 226 adjustably secured to a stub shaft 227 by a set screw 228. Projecting from the frame plate 113 is a bracket 229 into which the stub shaft loosely fits. One end of the stub shaft is supported by a bracket 230 also secured to the frame plate 113 and the arm 224 is urged upwardly as viewed in Figure 31 by a spring 231. The sleeve 226 is provided with a projecting lug 232 having a pin 233 which bears against the cam edge of a plate 234 secured to the bracket 230. When the knife 209 moves downwardly the arm 224 is rotated and moves the sleeve 226 with the shaft 227 and the pin 233 acts to cam the sleeve 226 downwardly as viewed in Figure 31, the knife being thus held against the cutter 218 but permitted movement from the position shown in Figure 32 to the position shown in Figure 33.

Immediately after the checks have been severed they are ejected from the machine onto a table having conveyor or gathering-up mechanism associated therewith.

Ejector mechanism

Just beyond the printing heads and supported in the side frames of the machine as shown in Figures 14 to 16 inclusive and Figure 23, is a shaft 235 carrying a roller 236 which at the proper time, as will be later described, is given a number of rotations sufficient to properly eject the checks. The actual ejection, however, of the checks is not brought about until other rollers, to be later described, one individual to each check web, are brought into contact with the checks which are to be ejected and which at the time overlie the roller 236.

This cooperating mechanism is carried by a casing 237, Figures 1 and 14. As shown at the left in Figure 1 the casing has a right angle projection which enters a groove 238 in the frame plate 115 which projects slightly beyond the front frame plate as shown. The whole frame is movable to a limited extent for a purpose which will be referred to in a moment. Carried by the frame 237 are a plurality of slides 240 having a slotted portion 241 engaging a stud 242 secured to the frame 237 as indicated very clearly in Figure 14. The lower portion of each slide 240 carries a roller 243, there being one slide and one roller for each printing head. Each slide at its upper end has a laterally projecting lug 244 to which is connected a spring 245 which spring at its lower end is connected to a lug projecting inwardly from the casing 237.

The springs 245 therefore normally tend to lower the slides and to cause their rollers 243 to engage the checks which overlie the roller 236 but this tendency of the springs is normally resisted by a series of fingers 246 projecting from a shaft 247 carried by brackets 248, Figure 16, said brackets supported from the frame plate 155. The fingers 246 underlie the lugs 244 and normally hold all the slides in the position shown in Figures 14, 15 and 16. Secured to the shaft 247 is an arm 250 connected by a link 251, Figure 23, with a bell crank 252, pivoted to the bracket 163 and having on one of its arms a roller 253 which is engaged by a cam 254 on the cam shaft 175. There is only one cam 254 as shown in Figure 31. It has been previously suggested that the cam shaft is given one rotation at each cycle of operation of the machine although the specific mechanism for doing this has not yet been described. The cam 254 in the normal position of the parts occupies the position shown in Figure 14. When the shaft 175 has made a little over half a rotation however and just after the knife has finished its cutting action as indicated in Figure 23, the cam 254 has reached the position there shown and the roller 253 drops off the cam and all of the slides 240 move downwardly under action of their springs 245. Immediately the rollers 243 engage the checks, the friction between these rollers and the checks and the roller 236 which is being rotated at this time, causes the checks to be fed forwardly onto a table. This table is shown at 255, Figure 23, and is slotted at 256 for the purpose of accomodating conveyor belts which act to gather up the checks into a pile. In order that the checks may smoothly pass onto the table the conveyor belts 257 are beveled on the side adjacent the approaching edge of the check as indicated at 258, the table 255 being also beveled at its check approaching edge as indicated at Figure 23. The checks are ejected from the machine onto the table towards the end of the cycle of operation and remain on the table until the beginning of the next cycle of operation at the beginning of which the gathering up mechanism becomes effective. The purpose of permitting the checks to remain visible for a short time is to enable them to be inspected and to do this effectively and to prevent access to the checks at this time, a glass cover 259 is provided. This cover is hinged at 260, Figure 23, and in order not to come in contact with the checks a rest 261 is provided which holds the cover free from the checks.

It has been stated that the casing 237 is movable. Such construction is provided in order to get access to the type slides containing the date and maker's signature. Referring to Figure 14 it will be noted that in the normal position of the casing 237 the rollers 243 prevent such access. The casing is provided with rack members 237a, Figure 15, and a shaft 238a suitably supported in the framing, carries a pinion 239a at either end for engagement with the racks 237a. The left hand end of this shaft carries a knob 240a, Figures 1 and 13, whereby such shaft may be rotated and the casing moved out of the way. It may be desirable to provide some sort of lock for holding the casing in its normal position so that no one but the properly authorized person may have access to the signature printing blocks or slides.

*Check gathering mechanism*

Suitably supported in the framework of the machine are two shafts 262, one of which is shown in Figure 23 and both of which are shown in Figures 13 and 29. These shafts carry sprocket wheels 263 spaced as indicated in Figure 23 and around them pass conveyor belts 264, each belt having two pins 265 and 266 located as indicated in Figure 13. The pins 265 of the two belts are in transverse alignment and the pins 266 likewise. The gearing for operating these conveyor belts is so timed that at each movement of the belt the pins 265 for instance will move from the position shown in Figure 13 to the position shown as being occupied by the pins 266. The pins project only a short distance from the belts, just sufficient to engage the checks and gather them up into a pile. This operation will be clearly understood from Figure 13 where the checks are shown in overlapping relation and at the left a pile of checks which has been previously gathered up is also indicated.

In Figure 23 it will be noted that the glass cover 259 is provided with grooves 267, the purpose being to give clearance to the pins 265 and 266.

*Transmission mechanism*

In connection with the adding machine operating mechanism reference has already been made to the motor 32. From this all of the power to operate the check printing and issuing mechanism is derived as well as power to operate the adding machine.

Referring to Figures 2 and 29, the motor 32 has a worm 34 for engaging a worm wheel 36 which is connected by clutch mechanism so as to give to shaft 30 one rotation at each depression of the motor key 24. The check issuing mechanism is also driven from the shaft 30 but provision is made whereby the entire check issuing mechanism may be rendered ineffective when it is desired to use the adding machine alone and without having any of the parts connected with the check printing and issuing mechanism effective. For this purpose a clutch shown in Figures 2 and 7 is provided. Pinned to the shaft 30 is a collar 270 and splined to the shaft 272 is a clutch 273 provided with a circular groove in which rides a pin 274 carried by two arms 275 secured to shaft 276, supported by brackets 277 secured to the under side of the adding machine base, (Figure 5). At its right end the shaft 276 carries an arm 277a to which is connected a link 278 operated by the non-pay key 280, Figures 2 and 7. This key performs a number of other functions which will be later described. Depression of the key results in the link 278 being thrust downwardly and the clutch 273 moved to disengage it from the fixed collar 270. Movement of the shaft 30 is therefore not transmitted to the shaft 272 under these conditions. At its left end the shaft 272 carries a right-angled drive gear 281 which meshes with a similar gear 282 on a horizontal shaft 283 at right angles to the shaft 272. The shaft 283 is supported by brackets 284 secured to the base of the check issuing machine as indicated in Figure 4.

Since the mechanism for gathering up the checks is operated at the beginning of the cycle of operation of the machine the power connections for it will be first described. The shaft 283 carries at its left hand end a mutilated gear wheel 285 which meshes with a pinion 286 on a stub shaft 287 mounted in an ear projecting from one of the brackets 284, Figure 4. At its left end the stub shaft 287 carries a beveled wheel 288 meshing with a beveled pinion 289 secured to the lower end of a vertical shaft 290 provided with a beveled pinion 291 at its upper end engaging with a pinion 292 on the right hand end of shaft 262, Figure 29.

Referring to Figure 13 the mutilated gear 285 is shown in elevation and it will be noted that the teeth extend for only a little over one-quarter of its periphery. Therefore the conveyor belts 264 which are driven from this mutilated gear are only moved during a portion of the cycle of the machine drive and then stopped. The number of teeth on the various transmitting gears and pinions from the mutilated gear 285 is such that the belts 264 are driven half around at each cycle of machine operation and this driving occurs at the very beginning of such cycle.

The shaft 283 is also connected with means whereby the cam shaft 175 and the ejector roller shaft 235 are driven. For this purpose the shaft 283 carries near its right end as shown in Figure 29 a beveled gear 293 which meshes with a similar beveled gear 294 on a vertical shaft 295.

For driving the ejector roll shaft 235 the shaft 295 has near its upper portion a right angled gear 296 which meshes with a right angled pinion 297 on a horizontal shaft 298. Its left end carries a similar pinion 299 engaging with a pinion 230 on the end of the shaft 235.

For driving the cam shaft 175 the vertical shaft 295 has a beveled gear 301 at its upper end which meshes with a similar beveled gear 302 attached to the cam shaft.

Means for operating the check feeding shaft 78

The feeding of the checks from their respective rolls to the printing heads is brought about by rotation of the shaft 78 under the control of the cam shaft 175.

It has been described how the checks are fed forward by sprocket chains 72, carrying pins 70 engaging perforations in the checks, and that these sprocket chains are carried by sprocket wheels on the shafts 78 and 80 respectively, and it has been stated that the shaft 78 is given one complete rotation during each cycle of operation of the machine. The particular mechanism for accomplishing this will now be described.

Referring to Figure 27 the shaft 78 is rotated, as already described, from the shaft 108 through the connections 106, 104 and 102. As shown in Figure 1 the shaft 108 is supported by the frame plates 110 and 113 and near its right hand end as shown in Figure 24 carries a sleeved disk 302 secured to the shaft by means of a pin. The disk 302 has a single notch in its periphery as shown at 303, Figures 9, 10 and 11. A second sleeve 304, Figures 11 and 24, is loose on the shaft 108 and carries a notched disk 305 at its left end and a pinion 306 at its right end. A pawl 307 is pivoted to the disk 302 and engages the notch in the disk 305 whereby the disk 302, and consequently the shaft 108, are driven when the disk 305 is rotated in the direction of the arrow shown in Figure 9. For the purpose of rotating the pinion 306 a toothed sector 308 is provided, this sector being loosely pivoted on the shaft 309, Figures 1, 9 and 10. The cam shaft 175 is supported in the frames 110, 113 and 115, Figure 1, and near its right hand end carries two cams, an unlocking cam 310, an operating cam 311, see also Figures 9, 10 and 31. A pawl 312 is pivoted on a stub shaft 313 and its lower lug 314 is normally in engagement with the notch 303 of the disk 302 and serves to lock the parts in normal position. At an early stage in the rotation of the cam shaft 175 the cam 310 engages a roller 315 on the locking pawl 312, Figures 9 and 30, and moves the locking pawl from the position shown in Figure 9 to a position whereby the disk 302 is released. The cam 311 becomes effective immediately thereafter and through its engagement with a roller 316, Figure 30, carried by the toothed sector 308, moves said sector from the position shown in Figure 9 to that shown in Figure 10. The teeth on the pinion 306 and on the sector 308 are arranged to give the shaft 108 one complete rotation. It will be noted from a comparison of Figures 9 and 10 that the cam 311 after moving the pawl 312 out of the notch 303 soon thereafter releases the pawl which drops back so that its lug 314 engages the periphery of the disk 302 and rides upon the periphery until the notch 303 again comes opposite the lug when the pawl 312 drops into the notch, it being urged to do so by its spring 317 connected above its pivot point 313. Rotation of the pinion 306 carries with it the disk 305 which through the pawl 307 transmits movement to the disk 302 secured to the shaft 108. A spring 318 connected to the toothed sector 308 holds it in working position against the cam 311. The pawl 307 is held in position by the spring 319. On the return of the toothed sector 308 the pawl 307 idles over the disk 305.

Cycle of operations

It will now be in order to refer again to the various operations of the machine and to the relative timing of these operations. To make this clear the diagrammatic view shown in Figure 37 has been prepared. This figure should be supplemented by reference to Figure 29.

Just as soon as an amount is set up on the keyboard of the adding machine and the motor key 24 depressed, the clutch controlled by said key will cause one rotation of the shaft 30, which in turn will pull on the link 40 and move the sector 45 which operates the selector bails 20 to determine the feeding and printing on the checks.

These bails 20 are operated during the very first part of the movement of the sector 46 and are represented in Figure 37 by the sector A.

The shaft 30 also operates the various mechanisms of the check issuing and printing machine and at the very beginning of operation the check gathering mechanism is effective and is represented by the sector B, Figure 37.

After the selector bars have been moved by the bail 47 and have selected the roll or rolls from which a check or checks may be fed and have determined which of the printing heads shall be operative, the checks are fed forward, this operation occurring during the interval indicated by the sector C.

The printing operation takes place at that portion of the cycle indicated by D although the rotation of the printing wheels of the printing head 52 takes place during the forward movement of the sector 46 and is under control of this sector. This is an important point because as will be described later the sector 46 is controlled in such a manner that the printing members of the printing head 52 are properly controlled in their movement to set position.

After the checks have been printed the severing mechanism becomes effective and this is indicated by the sector E, Figure 37.

The ejector mechanism then comes into play and the checks are moved out onto the table 255 to be gathered up during that part of the cycle indicated by the sector F.

Presser plates for checks

As the checks are fed by the sprocket chains 72 it is desirable that means be provided to keep them flat during their passage to the printing heads and for this purpose a series of presser plates are provided. As shown in Figure 25 the cross-bar 88 is provided with a series of bearings 320 and presser plates 321 have pintles for engaging in these bearings, the other end of the plates having pintles engaging bearings in the bar 87 as shown in Figure 14. Figure 25 also shows the bearings in the bar 88 while Figure 27 shows the bearings in the bar 87 and the top view of the presser plates 321. These plates are urged to position adjacent the checks although they do not actually contact therewith, by light springs 322, Figures 25 and 27, the springs being connected to pins projecting from the bar 88 and to upstanding arms 323 are bent at right angles as shown in Figure 14 and engage the top of the bar 88 to thereby limit the downward movement of the presser plates under action of their springs so that they do not exert a pressure against the checks. They would, however, prevent any tendency of a check to curl or depart substantially from its intended path of movement. As shown in Figure 25 the presser plates are slightly varied in shape, all of the left hand presser plates being of substantially the same shape while the extreme right hand one which rests just above the check web 67 is somewhat flatter through a greater portion of its width because this check does not have to slant upwardly at its right as do the other checks, this slanting of the check being necessary in order that they may clear the pins 70 of the sprocket chains which feed the next adjacent check to the right as viewed in Figure 25.

*Ribbon mechanism*

The printing heads operate to print from a ribbon which is carried by spools 324, one on either side of the series of printing heads, the ribbon passing under guide rods 325 and below the printing surfaces of the printing heads. Ribbon feeding and reversing mechanism is provided and since this may be of any usual or well known construction it has been shown rather schematically. Carried by the ribbon spool shaft are pawl carrying arms which support feeding pawls 326. The pawl arms are connected by a bar 328, Figure 2, so that both pawls are vibrated but only one is effective at a time, as is usual.

For vibrating bar 328 a connection from the cam shaft 175 is provided. At its left hand end, the bar 328 has a pin, Figures 1 and 27, which is engaged by the notched arm 330 of a bell crank whose other arm carries a pin 332 which may engage one or the other of two notches in a link 333. The latter is pivoted to a lever 334, Figure 34, and a link 335 joins said lever with cam shaft 175, the link being eccentrically pivoted to said shaft.

In order, however, that the ribbon may not interfere with the feeding of the checks and produce any smudging it is normally held clear of the check surface by a series of fingers 336 shown in Figure 2 but better shown in Figure 14. These fingers are all supported in a vertically slidable plate 337 which is slotted and through the slots pass guide screws 338, the slots and screws permitting an up-and-down movement of the plate and fingers. Normally the plate is held in the position shown in Figure 14 by toes 340 formed on the levers 169. Since all of the levers 169 are rocked by their respective cams 174, the plate 337 is permitted to move downwardly at each cycle of operation of the machine. Light springs 342, Figure 16, operate to move the ribbon supporting fingers downwardly when the toes 340 permit.

*Non-pay key*

In connection with the description of the transmission mechanism reference was made to the non-pay key 280, Figure 2, and to its control of the clutch 273 for the purpose of disengaging the check issuing and printing mechanisms from the motor drive of the adding machine.

In addition to this function the non-pay key 280 also disconnects the operating means for the bail 47 so that the selector bars 20 are not moved during the time that it is desired to use the adding machine alone. This key also prevents movement of the type bars of the adding machine from being transmitted to the printing members of the amount check printing mechanism.

The operating mechanism for the bail 47 has already been described and the connections are best shown in Figure 5. Movement of sector 46 would normally rock lever 51 and through the link 54 pivoted thereto, cause the shaft 48 to be rocked. The link 54 has been described as carrying a pin 55 at its end for entering a hole in the arm 52. The link may swing however to the dotted line positions of Figure 5 and thereby disconnect the drive between the sector 56 and bail 47. For this purpose a link 344 is connected at one end to the link 54 and at its other end to the lower arm of a lever 345, Figures 5 and 7. This lever is provided with a sleeve 346 for pivotal mounting on a stub shaft 347 secured to the frame 348 of the adding machine. The upper arm of the lever is forked to engage a pin 349 of an arm 350 secured to a shaft 351 which extends across from the right hand adding machine frame 348 and through two inner plates 352. In addition to supporting this shaft the left plate 352 acts as a guide for the non-pay key, such plate having a slot for this purpose. For convenience in assembling, the stem 354 of the non-pay key is apertured as shown in Figure 8. A threaded nut 356 is engaged by a headed screw 358 having a reduced portion which is guided in the slot in the plate 352 and is provided with a threaded portion for screwing into the nut 356. The end of this nut is shown in Figure 5 as contacting a cam edge of a finger 357 secured to the shaft 351. Depression of the non-pay key 280 will therefore rock the shaft 351 and through the connections just described, cause the link 54 to free its pin from the arm 52.

The connections from the non-pay key to the clutch controlling link 278 consist of an arm 369 connected to a sleeve 362 pinned to a shaft 364 and suitably supported in the adding machine frame. The sleeve also carries an arm 366 to which the clutch operating link 278 is pivoted.

It will be recalled that the printing head 152 carries type members which are set to indicate different amounts under control of the type carriers 178 of the adding machine, the movement of these members being transmitted from the type carriers through the three lower shafts 180 shown in Figure 7. It is not desirable that these printing members be turned when the adding machine is being used alone nor is it necessary that the envelope printing type carriers 182 be operated. Connections are therefore provided whereby the non-pay key may render these printing members ineffective and free the type carriers 178 from the type carriers 182.

For this purpose the shaft 364 which is rocked when the non-pay key is depressed, carries a bell crank 370 which is pinned to the shaft 364, Figures 5, 7 and 8. The vertical arm of the bell crank as shown in Figure 5, is pivotally connected to a link 372 which is in turn pivoted to an arm 374 of a member 376 carrying a fin 378, Figure 8, which fin is of such length as to engage grooves 379 of collars 380 one of which is secured to each shaft 180. By the means just described depression of the non-pay key will result in the moving of all of the shafts 180 to the right and will disconnect the pinions 179 from the racks 178. The pinions 181 are of such width that this lateral movement of the shafts 180 will not destroy the connection between these pinions and their associated rack 182.

In order to hold the wheels 179 in proper alignment when disengaged the collars 380 are notched at 382, Figures 7 and 8, and engage a stationary plate 384 having projections for entering the notches when the collars are moved to the right as viewed in Figures 7 and 8. The bell crank lever 370 has a pin 385 projecting laterally from one arm and a spring 386 connects this pin with a frame plate to hold the shaft 364 and parts connected thereto in normal position.

The non-pay key 280 is also provided with a spring 387 which normally acts to hold the key in its upper position. When the key is depressed it is moved backward a slight amount and a notch 388 may then engage under the top plate of the machine and hold the key in depressed position against the tension of the spring 387.

A spring 389 is connected to an arm 390 on the shaft 351, Figure 5, and acts to hold this shaft and its connected parts in normal position whereby the pin 55 of the link 54 is normally held in engagement with the arm 52.

Check web exhaust indicator

It is desirable that some indication be given when a check web is exhausted or if for any other reason a complete check is not supplied to a printing head. In the present disclosure such failure of a check web is indicated by a bell although other forms of signaling devices may be employed. Figure 16 shows the signal control mechanism in normal position such as it would assume as long as a check web remains intact. Figure 26, however, shows the signal mechanism in its operating position such as it would assume upon the exhaustion of a check supply or breakage of a check web.

The signal operating mechanism is carried by the plate 86 which is spaced from the plate 90 by spacing collars 398. Sliding on the plate 86 are a plurality of members 400, one of which is shown in plan in Figure 27, said members being slotted for engaging the collars 398 by which they are guided. A spring 399 connected between a member and the plate 86 urges the member to the right. The right end of each member has a downwardly projecting finger 402 which is in the same vertical plane as a pin 404 on the side of each of the sprocket wheels 74. Each member 400 has upwardly extending ears 406, Figures 26 and 27, which act as a support for a feeler 408. Each feeler is provided with projections 409 engaging in the space between the adjacent ears 406 and with a downwardly projecting lug 410 at its left hand end and an upwardly projecting lug 411 at its right end. A spring 412 cemented to each feeler tends to rock it towards the position shown in Figure 26 and project its lug 411 through slots 414 cut in the plate 90 and through slots 416 cut in the presser plates 321 as shown at the left in Figure 27.

Normally all of the feelers are held in the position shown in Figure 16 by a check web. As any wheel 78 rotates, in feeding forward a check web, its pin 404 will engage the finger 402 and move its associated member 400 but as long as the check web remains intact the lug 411 will not be projected, the lug merely moving back and forth in the slot 414 which is of sufficient length to permit such movement. If, however, a check web is exhausted or broken then the spring 412 acts to rock a feeler 408 about its bearing in ears 406, to the position shown in Figure 26. This rocking of the feeler will position its lug 410 in front of a bail 418 extending along in front of all of the members 400 and supported on a shaft 420. At its left end the shaft 420, Figure 34, carries a three-armed piece 422, pivoted to the upper arm of which is a pawl 424 having a tail 425 which is held in contact with a pin 426 by spring 427 connected to the right arm of the three-armed piece 422. Another spring 428 holds the piece in the position shown in Figure 34 and likewise holds the bail 418 in the upright position shown in Figure 16. When the bail is operated by the lug 410 the three-armed piece 422 is rocked in the direction of the arrow Figure 34. The hook 429 of the pawl engages a downward projecting lug 430 of a lever 432 supported on a shaft 433 and carrying spaced lugs 434. A bell hammer 436 is also pivoted on the shaft 433. A spring 438 connected to a lug 439 in the lever 432 holds the lever against a stop 440. The width of the bell hammer shank is somewhat narrower than the space between the lugs 434 so that the hammer may have a rebound after striking the bell.

Having set forth in detail the operation of the machine to cause the issuance of checks representing a definite set up, together with the further handling of the checks after they have been printed upon, it will now be in order to explain the inter-relation between certain well known structures found in adding machines and certain parts of the check issuing mechanisms whereby many new and important results are achieved.

The following sets forth a few of these results but it is by no means exhaustive. It is merely to illustrate the scope of the invention from the standpoint of new accomplishments.

By the combinations disclosed it is possible for the first time in the art, as far as I am aware, to perform the following operations—

(a) Print the amount on a check and sign the same and at the same time accumulate a total of the several check values.

(b) Control the printing of a date on a check of selected value and total the value of a plurality of checks so selected.

(c) Control the signing of a check of selected value and total the value of a plurality of checks so selected.

(d) Cause the concomitant selection of a plurality of valuated checks and the concomitant printing of the aggregate value.

(e) Select a plurality of valuated checks of a definite value and repeatedly eject sets of checks of the selected aggregate value.

(f) Select a plurality of valuated checks of a definite value, repeatedly eject sets of checks of the selected aggregate value, repeatedly print the sum of each set of checks ejected and automatically print the total of all the series.

(g) Set up an amount and automatically select a check from a plurality of checks, print the amount set up on the check selected and automatically print a total of the amount printed on a plurality of checks so selected.

Further details of the mechanism utilized to bring about these operations will now be described.

Key locking and release mechanism

In the early part of this description reference has been made to the keys 29 of the adding machine and to their control of the selector bars 20. In order, however, that the selector bars may be maintained in operated position for a sufficient time to determine the selection of one or more check webs and the selection of those printing heads which are to be operated, it is necessary that the keys be retained in their depressed position until the checks have been fed forward to the printing heads and the printing on the checks is completed.

Referring to Figures 6, 41, 42 and 43 the keys 29 have oblique slots in their shanks which engage pins on horizontally slidable index stops 450, there being one of these stops for each key. Each stop is provided near its front end, Figure 42, with a rounded catch 452 and a pivoted plate 454 is arranged in such a manner as to cooperate with the stops of all the keys of a denominational row of keys. Springs 455 tend to hold the plates against the stops. If a second key in the same row is depressed the previously depressed key would be released thus providing a flexible keyboard. Arranged to slide transversely of the several plates 454 is a release bar 456 having hooks 458 arranged to engage and simultaneously move all of the plates 454 to release the keys. If an error is made in the set up the keys may be released by means of the error key 458 which at its lower portion is provided with a cam 460, Figure 45, which contacts with and is adapted to rock a swinging release bail 462 pivoted to a shaft 464. A spring 466 holds the error key in normal position and its lower end is slotted and engages a guide pin 467 for guiding it in vertical movement. The lug 460 on the error key is of such length that full depression of the error key will not result in said lug passing below the edge of the bail 462 thereby precluding the possibility of the error key being locked down by said bail. The left arm of the bail as shown in Figure 41 is adapted to engage the release bar 456.

Figure 43:
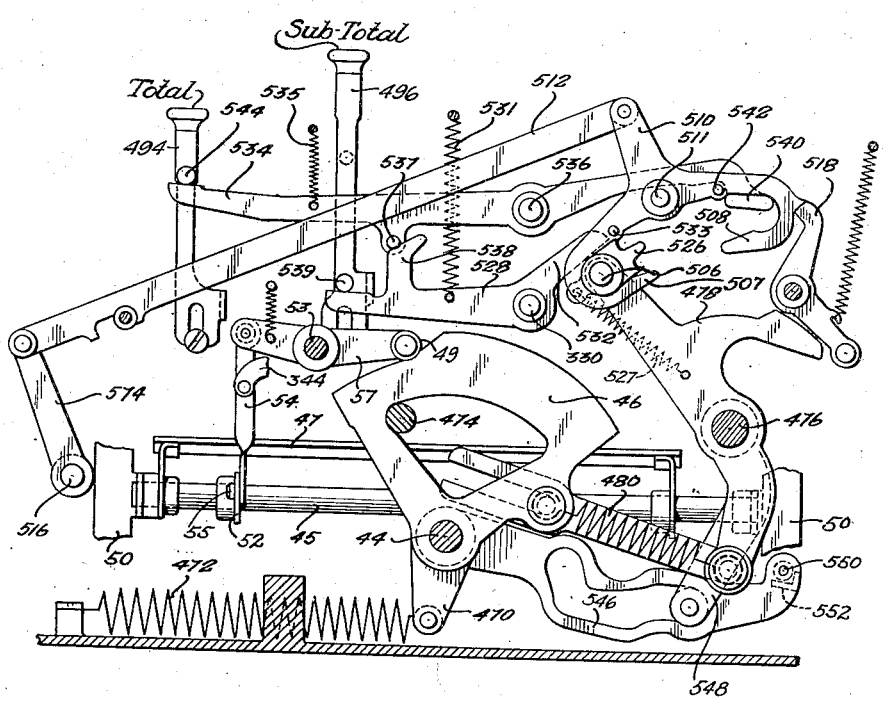
Figure 43 is a view similar to Figure 5 but showing the mechanism for controlling the movement of the totalizer under various adjustments.

The bail 462 is also adapted to be operated to release the keys near the completion of the return movement of the sector 46, which sector, it will be remembered, controls the movement of the selector bars 20. Referring to Figures 6 and 43 it will be noted that the link 40 connects with a crank 38 and with an arm 42 on the shaft 44 to which the sector 46 is likewise secured. Also secured to the shaft 44, near either end thereof, are downwardly projecting arms 470 to which are attached springs 472 for returning the shaft 44 to normal position. A stop 474, Figure 43, engaging the sector 46 acts to limit the movement of the parts under action of said springs. A shaft 476 supported in side frames carries a lever 478, the lower end of which is connected with the sector 46 by a flexible link connection 480. When the sector 46 moves forward from the position shown in Figure 43 the lever 478 is adapted to follow by reason of the spring connection. However, if the sector movement is too rapid the spring will stretch, since the lever 478 and parts controlled thereby are under dash pot control. Secured to the shaft 476 is an arm 481, Figure 41, whose outer end carries a pin which engages a lever 482 pivoted at 483 in the lower portion of the key supporting frame 484. The lever 482 has a trip arm 485 pivoted near its outer end, said trip arm having a link engaging a stud 486 to limit the movement of the trip arm. When the shaft 44 starts to operate the arm 481 moves clockwise as viewed in Figure 41 and permits the lever 482 to move in the same direction under action of its spring 487. The trip arm 485 will pivot about its center by reason of its lower end and will trip over a stud 488 projecting from the bail 462. After passing the stud the spring will cause the trip arm to again assume the upright position shown in Figure 41 but its front edge will be on the other side of the stud 488. Upon the return movement of the parts the arm 481 will positively rock the lever 482 and the engagement of the trip arm with the stud 488 will cause the bail 462 to be rocked, thereby releasing all of the keys 29.

It is frequently desirable, especially in making up payrolls, to issue a number of series or sets of checks all totaling the same amount and in order to do this without having to re-set the keys the present construction enables the repeat mechanism of the adding machine to be utilized for this purpose.

In Figure 41 the repeat key 490 is guided in the frame 484 and is normally upheld by a spring 491. A notch 492 enables the key when depressed to be engaged with the upper keyboard plate to thereby hold it in depressed position as long as desired. When depressed, a stud 493 on an arm projecting forwardly from the key engages the face of the lever 482 and prevents it from moving under action of its spring when the arm 481 would otherwise permit such movement. Therefore the keys 29 which have been depressed and locked in depressed position will not be released until the repeat key has been manually rendered ineffective, which may be done of course by giving it a slight forward movement to release its notch when the spring 491 will lift it to normal.

The keys 29 are also adapted to be released upon the depression of a key 494 which also functions as a total key and by the key 496 which functions as a sub-total key. The total key has a lug 497 normally situated just above the bail as shown in Figure 47, whereby the bail is rocked upon depression of said key. The sub-total key is provided with a similar lug 498 which operates in the same way. It will be noted, however, that the lugs 497 and 498 are shorter than the lug 460 on the error key and therefore full depression of either the total or sub-total keys will result in their lugs engaging under the bail and being held by it. Either of these keys of course can be released by depression of the error key and they are released also by the operation of the shaft 44 through the connections including the trip arm 485.

Totaling the check values

It has already been suggested that the total of the amount printed on a check may be indicated and likewise the total value of checks which are selected and dated, also the total of a plurality of valuated checks which have been selected for issuance concomitantly with the issuance thereof. These various results are accomplished by properly coordinating the totaling mechanism of the adding machine, which has been selected as a part of the present disclosure, with the check selecting, printing, signing and issuing mechanisms, and their operating means.

The depression of a key 29 in setting an indexing stop 450 also operates a locking and release bar 500, Figures 6 and 42, the key shanks having pins projecting from their sides and cooperating with cams on said bar to effect this movement. At their forward end each bar 500 has a lug 502 which normally engages a lip 503 projecting from an adding rack 175, the adding racks being normally in the position shown in Figure 6. When any key is depressed not only is the bar 500 moved to release a rack but a shoulder 504, of which one is provided for each key, is moved under the pin on the keys which have not been depressed and serves to lock them in their normal position. The rack bars 175 are guided for vertical movement in suitably supporting frames and accumulating mechanism indicated generally by the numeral 504, is adapted at the proper time to be moved into engagement with the teeth of the rack bars. Normally the accumulator is disengaged from the rack bars which freely descend to positions determined by the set keys. When the shaft 44 and sector 46 have made about a half cycle of movement, the accumulator is thrown into mesh with the rack bars and the wheels of the accumulator are turned during the restoration of said rack bars.

The accumulator is moved to and fro by connections from the lever 478, Figure 43, pivoted at 476 which carries at its end a stud 506 operating on cam edges 507 and 508 of a three-armed lever 510 pivoted at 511. A link 512 connects the lever 510 with an arm 514 secured to a shaft 516 which supports the accumulator frame. The parts are in such position in Figure 43 that the accumulator is disengaged from the racks. When the shaft 44 is rocked, thereby rocking the lever 478, in a clockwise direction, the stud 506 acting on the cam 508 will cause the lever 510 to be rocked near the end of the rearward movement of the lever 478 and thereby cause the accumulator to be engaged with the racks at this time. A pawl 518 detains the lever 510 in either position to which it is moved.

The setting of an amount on the keys 29 and the operation of the shaft 44 will result in turning the wheels of the accumulator an amount determined by the set up.

When any wheel of the accumulator passes from 9 to 0, Figure 50, in an anti-clockwise direction a cam 520 operates a carrying arm 522 which in turn trips a latch 524 for the purpose of causing a carry to the wheel of next higher order. The details of this mechanism have not been fully illustrated since suitable carrying mechanism may be provided. Reference is made to said White Patent No. 1,192,721 for a detailed description of the carrying mechanism here illustrated. For the present purpose it is sufficient to state that during total and sub-total operations the accumulator frame is rocked into mesh prior to the descent of the racks and the wheels of the accumulator are reversely rotated until the cam 520 of any displaced wheel engages the upper side of the carry arm 522. This determines the zero position of the wheels and is the position illustrated in Figure 50. As is usual in this type of machines the descent of the racks measures the amount of upward movement of the type carriers 156 so that the total standing in the accumulator may be printed by the type carriers.

The total and sub-total keys operate to enmesh the accumulator with the racks prior to the descent of the latter and the mechanism for doing this is illustrated more particularly in Figure 43. The arm 478 which it will be remembered is rocked clockwise from the normal position shown in Figure 43 through about 30° of movement, in addition to the stud 506, also carries a wipe pawl 526 having a spring 527 which normally tends to straighten the wipe pawl. During ordinary accumulating operations this wipe pawl does not function and to render it ineffective at this time there is provided a lever 528 pivoted about a center 530 and urged in a clockwise direction by a spring 531. An arm 532 normally engages the wipe pawl and holds its upper notch out of contact with a pin 533 on the three-armed lever 510. When, however, the total key or the sub-total key is depressed the lever 528 is rocked sufficiently to relieve the pressure of the arm 532 against the wipe pawl and the spring 527 immediately moves the wipe pawl so that its upper notch engages the pin 533. Therefore the lever 478 on its initial movement will cause the three-armed lever 510 to be rocked and the totalizer to be moved into engagement with the racks.

The control of the lever 528 by the total key is brought about by a lever 534 pivoted at 536 and having a stud 537 engaging an arm 538 of said lever 528 whereby it is rocked about its pivot when the total key is depressed. The sub-total key on the other hand has a stud 539 which directly engages the end of the lever 528 to rock it in the same manner. The lever 534 controlled by the total key has a cam end 540 which is so positioned that when the total key is in its normal position the cam end interferes with the engagement of the wipe pawl with a pin 542 situated on the opposite side of the pivot 511, from the pin 533, thereby preventing rocking of the lever 510 on the return movement of the wipe pawl during addition operations. The total key, however, has a stud 544 which engages the end of the lever 534 so that its cam end 540 is moved from interfering position and therefore when the arm 478 begins its return movement the wipe pawl will engage the pin 542 and disengage the accumulator wheels from the racks at the beginning of the return movement of the sector 46.

The sub-total key on the other hand has no connection with the lever 534 and therefore said lever occupies the position shown in Figure 43 during the depression of the sub-total key with the result that the wipe pawl will not engage the pin 542 on its return stroke and the accumulator frame will remain in its rocked position and the amount which the racks have extracted from the wheels in turning them to normal zero position will be re-entered as the racks return, as is usual in sub-total taking operations. A spring 535 normally holds the lever 534 in its working position.

*Control of the check printing members*

It is desirable that the movement of the type members carried by the printing head 152 be properly controlled in their movement to set position and as has already been described they are connected to the type carriers 178, Figure 7, by the three lower shafts 180. One of the reasons for making connection in this way is to take advantage of the fact that the type carriers 178 are controlled by dash pot mechanism and the timing of the connections for operating the cam shaft 175 and the position of the cams thereon is such that the printing impression is not made from the type heads 150 and 152 until the dash pot control parts have been fully operated. This inter-relation of parts and function makes it possible to use the mechanism already provided in adding machines for accomplishing desirable results in connection with the check printing operations.

Referring to Figures 6 and 43, there is shown a member 546 provided with an irregular cam slot, there being one of these members on either side of the machine and both are loosely pivoted on the shaft 44. Rigidly secured to the shaft 476 are depending arms 548 one on either side of the machine, having at their ends studs which enter the cam slots of the members 546 so that said members are rocked about the shaft 44 when the latter shaft and sector 46 are rocked. A tie rod 550 connects the two members 546 and a right angled detent bar 552 is also provided which engages all of the levers 176 to hold the racks 175 in their upper position and the type carriers 178 in their lower position. Springs 554 are connected to arms 555 on the levers 176 and tend to elevate them when the detent bar 552 permits such movement.

Supported on a cross rod 556 of the adding machine is a dash pot 558 whose plunger rod 559 is connected to a cross bar 560. A rock shaft 561 has secured thereto an arm 562 which is pivotally connected to the dash pot plunger. The shaft 561 has another arm 563 which is forked at its lower end and engages over a pin 564 on a full stroke sector 565 secured to the shaft 476.

The latter shaft is therefore controlled in its movement by the dash pot and all the parts which derive movement from said shaft are likewise controlled, including the detent bar 552. Since the latter bar controls the movement of the type carriers 178 which in turn control the check printing type members these latter are thereby moved to printing position under dash pot control.

In Figs. 6 and 29 the link 40 is shown as provided with a slot which will make possible operating the adding machine alone by hand without disconnecting the motor connection.

*Type impression means*

Imprint is made from movable type carried by the main type carriers 178 and by the auxiliary type carriers 181, by means of type hammers 566, Figures 6 and 48. A set of hammer drivers 568 are provided, each connected with its adjacent hammer, likewise a set of hammer catches 569 adapted to engage over lugs 570 projecting from the hammer drivers. The type hammers are supported on a shaft 572 which also forms a pivot for a lever 574 carrying the hammer catches 569 and about which the hammer drivers also pivot. The lever 574 is rocked from the shaft 561 by means of a link 576. Figure 6 shows the normal position of the parts with the hammers barely contacting with the end of the type and with the catches hooked over the lugs 570. During the forward stroke of the sector 46 and consequent rocking of the shaft 476 in a clockwise direction, the full stroke sector 565 is moved towards the position shown in Figures 48 and 49, which figures, however, show the extreme position. During this movement the catches gradually pull the hammers away from the type and stretch the hammer driver springs 577 and as the parts reach the position shown in Figure 48 the tails of the catches engage a cam portion 578 of an operated type carrier and at the final position of the parts as shown in Figure 48 the catches are disengaged from the lugs 570 and the hammers driven to print. There is a slight lost motion between the hammers and drivers to permit a slight rebound of the hammers to prevent blurring of the type as is common in mechanism of this character. As is also usual in machines of this type the movement of a type carrier of higher order causes printing of zeros to the right of the highest significant digit since the tails of the catches overlap to the right and the zero of the type carriers is normally at the printing point.

What is claimed as new is:

1. In a payroll check machine, in combination, a plurality of rolls of checks, each check having a monetary value indicated thereon, the values however differing among the rolls, means for applying the date and maker's signature to a plurality of checks simultaneously and means for selecting checks from one or more rolls and presenting them to the date and signature applying means.

2. In a payroll check machine, in combination, an adding machine having amount keys and operating means, a plurality of webs of connected checks, each check having a monetary value indicated thereon, and a web of connected blank checks, means for printing the date and maker's signature on the valuated checks and on the blank check and means for additionally printing an amount on the blank check, means controlled from the amount keys of the adding machine for selecting a plurality of valuated checks and a blank check, and means controlled from the operating means of the adding machine for presenting the selected checks to the check printing means.

3. In a payroll check machine, in combination, an adding machine having amount determining means, a plurality of webs of connected checks, a check feeding device and a printing head for each web, means controlled from the amount determining means for selecting the printing head and web feeding device to be operated, and means for operating the selected head and device.

4. In a payroll check machine, in combination, an adding machine having amount determining devices, a web of connected blank checks, web feeding means, a printing head having individually settable type carriers, means for simultaneously setting type carriers in a plurality of denominations in accordance with the setting of the amount determining devices of the adding machine, and means controlled from said amount determining devices for rendering operative said web-feeding means.

5. In a payroll check machine, in combination, an adding machine having amount determining devices, a plurality of supply parcels of checks, the checks of each of said parcels having monetary values indicated thereon, a supply of blank checks, settable type carriers for printing values on said blank checks below the value of the lowest valuated checks, and means controlled from said amount determining devices for selecting and feeding the valuated checks of higher values and for setting said type carriers for printing lower values on said blank checks.

6. In a payroll check machine, in combination, an adding machine having amount determining devices, and check printing and check signing means under control of the amount determining devices.

7. In a payroll check machine, a supply of checks, means for selecting and issuing a plurality of checks of definite aggregate value during a cycle of operation of the machine, the issued checks being exposed to view, and means for stacking the issued checks on the next cycle of operation of the machine in selecting and issuing checks.

8. In a payroll check machine, in combination, a plurality of parcels of checks, each having a monetary value indicated thereon and a parcel of blank checks, means for predetermining the total value of checks desired, means for selecting one or more valuated checks and a blank check, and for printing on a blank check the difference between the aggregate value of the valuated checks selected and the total value.

9. In a payroll check machine, the combination with amount-setting devices and operating means, of a plurality of rolls of checks, each check having a monetary value indicated thereon, the values, however, differing among the rolls, means for applying the date and maker's signature to the checks, means controlled from said setting devices for selecting a check from one or more rolls and means actuated by said operating means for presenting the selected checks to the date and signature applying means.

10. In a payroll check machine, the combination with amount determining devices, of means under control thereof for selecting and feeding a plurality of partly overlapped webs of checks, each check having a monetary value indicated on that part of the check overlapped by the adjacent check and means for applying the maker's signature to the exposed portion of the checks selected.

11. In a payroll check machine, in combination, an adding machine having amount determining devices and operating means, a plurality of parcels of valuated checks, check dating and check signing means, means under control of said amount determining devices for selecting checks from a plurality of parcels of checks and means under control of said operating means for dating and signing the checks so selected.

12. In a payroll check machine the combination, an adding machine having amount determining devices and operating means, a plurality of parcels of checks, each check having a monetary value indicated thereon, means under control of said amount determining devices for selecting a check from one or more of said parcels aggregating in value the amount set up and means controlled from said operating means for applying the maker's signature to the checks selected.

13. In a payroll check machine, in combination, adding and listing mechanism and amount determining devices, a plurality of supply parcels of valuated checks and a parcel of blank checks, means controlled from the listing mechanism for printing an amount on a blank check, means controlled from the amount-determining devices for selecting a plurality of checks from said parcels of valuated checks, the aggregate value of the valuated checks and the amount printed on the blank check being equal to the total set up on the amount determining devices and auxiliary means controlled from said listing mechanism for printing the amount set up and an envelope holder adapted to support an envelope adjacent said auxiliary printing means.

14. In a payroll check machine, the combination with amount determining devices, of a plurality of parcels of valuated checks, printing and feeding means associated with each parcel, means under the control of said amount determining devices for selecting for operation the printing and feeding means associated with a plurality of parcels of checks and means for operating the selected printing and feeding means.

15. In a payroll check machine, in combination, a plurality of valuated but unvalidated checks, the checks of some of the parcels having a value different from those of other parcels, amount setting-up devices, validating mechanism and means controlled from said setting-up devices for selecting from a plurality of parcels, checks aggregating in value the amounts set up and for rendering operative the validating mechanism corresponding to the checks selected.

16. In a payroll check machine, in combination denominational setting keys, devices for printing an amount on a check, signature applying means, and means controlled by said keys for determining the amount to be printed on the check and the operativeness of said signature-applying means.

17. In a payroll check machine the combination with denominational keys, of a plurality of supply parcels of valuated but undated checks, check dating means, and means controlled by said denominational keys for selecting checks aggregating in value the amounts set up and for rendering effective the dating means.

18. In a payroll check machine the combination with denominational keys, of check printing devices, signature applying and date printing means, and means controlled by said keys for rendering operative said check printing devices, said signature-applying and date printing means.

19. In a payroll check machine the combination with denominational keys, of signature-applying and date printing means, and means controlled by said keys for rendering operative said signature-applying and date printing means.

20. In a payroll check machine the combination with denomination keys, of check printing devices, signature-applying and date printing means, means controlled by said keys for determining the degree of actuation of said check printing devices and means also controlled by said keys for rendering operative said check printing devices and said signature-applying and date printing means.

21. In a payroll check machine, in combination, amount determining devices, a plurality of webs of connected checks, each check having a monetary value indicated thereon and a web of connected blank checks, the blank check web partly overlapping the next adjacent web and it in turn overlapping the next web seriatim and covering that portion whereon the value is indicated, means for printing the date and maker's signature on the exposed surface of the overlapped checks and on the blank check, and means controlled by said amount determining devices for additionally printing an amount on the blank check.

22. In a payroll check machine the combination with amount determining devices, of means under control thereof for feeding a plurality of partly overlapped webs composed of connected checks, each check having a monetary value indicated thereon, means for simultaneously applying the maker's signature to the exposed surface of the overlapped checks and means for ejecting checks to which a signature has been applied.

23. In a payroll check machine, in combination, an adding machine having amount determining devices and operating means, a plurality of webs of connected checks, each check having a monetary value indicated thereon, check feeding means, check severing means, means controlled from said amount determining devices for selecting from which roll or rolls a check is to be fed and means under control of said operating means for feeding forward a selected check and for severing the checks selected and fed forward.

24. In a payroll check machine, in combination, an adding machine having amount determining devices and operating means, a plurality of webs of connected checks each having a monetary value indicated thereon, check feeding and check severing means, means controlled by said amount determining devices for selecting which web or webs are to be fed forward, the aggregate value of the checks so selected equaling the amount set up on said amount determining devices, means under control of said operating means for feeding forward the selected checks to the severing means and means also operated from said operating means for ejecting the severed checks and for gathering them into a pile.

25. In a payroll check machine, in combination, means carrying a plurality of supply parcels of valuated but unvalidated checks, means for validating the checks, means for selecting for validation from a plurality of parcels, checks aggregating a definite amount, means for feeding the selected checks to the validating means and means for operating the machine, said last mentioned means causing the feeding of selected checks and the validation thereof during a cycle of operation.

26. In a payroll check machine, in combination, means carrying a plurality of supply parcels of checks each check having a monetary value indicated thereon, means for selecting from a plurality of said parcels checks aggregating a given sum, means for simultaneously applying the maker's signature to the checks selected and means for operating the machine, said last mentioned means causing the selecting means and the signature applying means to function in a given cycle of operation.

NELSON C. OVAITT.